United States Patent
Kwon et al.

(10) Patent No.: US 11,277,501 B2
(45) Date of Patent: Mar. 15, 2022

(54) BROADCAST SIGNAL TRANSMISSION DEVICE, BROADCAST SIGNAL TRANSMISSION METHOD, BROADCAST SIGNAL RECEPTION DEVICE, AND BROADCAST SIGNAL RECEPTION METHOD

(71) Applicant: LG ELECTRONICS INC., Seoul (KR)

(72) Inventors: Woosuk Kwon, Seoul (KR); Joonhee Yoon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/757,665

(22) PCT Filed: Nov. 9, 2018

(86) PCT No.: PCT/KR2018/013655
§ 371 (c)(1),
(2) Date: Apr. 20, 2020

(87) PCT Pub. No.: WO2019/093829
PCT Pub. Date: May 16, 2019

(65) Prior Publication Data
US 2020/0336572 A1 Oct. 22, 2020

Related U.S. Application Data

(60) Provisional application No. 62/614,915, filed on Jan. 8, 2018, provisional application No. 62/584,109, filed on Nov. 9, 2017.

(51) Int. Cl.
*H04L 29/06* (2006.01)
*H04L 69/22* (2022.01)
(Continued)

(52) U.S. Cl.
CPC .............. *H04L 69/22* (2013.01); *H04L 12/66* (2013.01); *H04L 47/36* (2013.01); *H04N 21/2381* (2013.01); *H04N 21/64322* (2013.01)

(58) Field of Classification Search
CPC ......... H04L 69/22; H04L 12/66; H04L 47/36; H04N 21/2381; H04N 21/64322
(Continued)

(56) References Cited

U.S. PATENT DOCUMENTS

2009/0287843 A1* 11/2009 Morimura ........... H04L 49/9094
709/236
2014/0016545 A1 1/2014 Jaiswal et al.
(Continued)

FOREIGN PATENT DOCUMENTS

CN 105379259 A 3/2016
CN 106063280 A 10/2016
(Continued)

OTHER PUBLICATIONS

"A/330, ATSC Standard: Link-Layer Protocol A/330", ATSC Advanced Television Systems Committee, Doc. A/330:2019, May 3, 2019.

*Primary Examiner* — Obaidul Huq
(74) *Attorney, Agent, or Firm* — Dentons US LLP

(57) ABSTRACT

A broadcast signal transmission method according to one embodiment of the present disclosure comprises an IP layer processing step of generating Internet protocol (IP) packets including broadcast data and generating fragmented IP packets by fragmenting at least one IP packet of the IP packets in order to transmit to a link layer, a first link layer processing step of restoring the at least one IP packet by combining the fragmented IP packets of the IP packets output at the IP layer processing step, a second link layer processing step of performing header compression of IP packet including the restored at least one IP packet, and a third link layer processing step of encapsulating the header (Continued)

compressed IP packets into at least one link layer packet and transmitting the at least one link layer packet to a physical layer.

8 Claims, 40 Drawing Sheets

(51) Int. Cl.
*H04L 12/66* (2006.01)
*H04L 47/36* (2022.01)
*H04N 21/2381* (2011.01)
*H04N 21/643* (2011.01)

(58) Field of Classification Search
USPC .................................................. 370/464, 474
See application file for complete search history.

(56) References Cited

U.S. PATENT DOCUMENTS

| | | | |
|---|---|---|---|
| 2016/0218902 A1* | 7/2016 | Hwang | H04L 1/0618 |
| 2016/0219133 A1* | 7/2016 | Kwon | H04L 69/04 |
| 2016/0234101 A1 | 8/2016 | Sundar et al. | |
| 2016/0277198 A1* | 9/2016 | Kwak | H04L 47/827 |
| 2016/0294914 A1* | 10/2016 | Kwon | H04L 69/22 |
| 2016/0337486 A1 | 11/2016 | Kwon et al. | |
| 2016/0337487 A1 | 11/2016 | Kwon et al. | |

FOREIGN PATENT DOCUMENTS

| | | | | |
|---|---|---|---|---|
| EP | 3046304 A1 * | 7/2016 | | H04N 21/814 |
| KR | 10-2004-0045933 A | 6/2004 | | |
| KR | 10-2009-0013992 A | 2/2009 | | |
| KR | 10-2016-0026910 A | 3/2016 | | |
| KR | 10-2016-0059477 A | 5/2016 | | |
| KR | 1020160084833 A | 7/2016 | | |

* cited by examiner

FIG. 3

| Syntax | No. of Bits | Format |
|---|---|---|
| LLS_table() { | | |
|   LLS_table_id | 8 | uimsbf |
|   provider_id | 8 | uimsbf |
|   LLS_group_Id | 8 | uimsbf |
|   group_count_minus1 | 8 | uimsbf |
|   LLS_table_version | 8 | uimsbf |
|   switch (LLS_table_id) { | | |
|     case 0x01: | | |
|       SLT | var | Sec. 6.3 |
|       break; | | |
|     case 0x02: | | |
|       RRT | var | See Annex F |
|       break; | | |
|     case 0x03: | | |
|       System Time | var | Sec. 6.4 |
|       break; | | |
|     case 0x04: | | |
|       CAP | var | Sec. 6.5 |
|       break; | | |
|     default: | | |
|       reserved | var | |
|     } | | |
| } | | |

(t3010)

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1...999 |
|     @minorChannelNo | 0..1 | 1...999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcsignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte |

| Element or Attribute Name | | | | | Use | Data Type |
|---|---|---|---|---|---|---|
| bundleDescription | | | | | | |
| | userServiceDescription | | | | | |
| | | @globalServiceID | | | 1 | anyURL |
| | | @serviceID | | | 1 | unsignedShort |
| | | @serviceStatus | | | 0..1 | boolean |
| | | @fullMPDUri | | | 1 | anyURL |
| | | @sTSIDUri | | | 1 | anyURL |
| | | name | | | 0..N | string |
| | | | @lang | | 1 | language |
| | | serviceLanguage | | | 0..N | language |
| | | capabilityCode | | | 0..1 | string |
| | | deliveryMethod | | | 1..N | |
| | | | broadcastAppService | | 1..N | |
| | | | | basePattern | 1..N | string |
| | | | unicastAppService | | 0..N | |
| | | | | basePattern | 1..N | string |

— t4010

| Element or Attribute Name | | Use | Data Type |
|---|---|---|---|
| S-TSID | | | |
| | @serviceID | 1 | unsignedShort |
| | RS | 1..N | |
| | | @bsid | 0..1 | unsignedShort |

| Element or Attribute Name | | | Use | Data Type |
|---|---|---|---|---|
| | | @sIpAddr | 0..1 | string |
| | | @dIpAddr | 0..1 | string |
| | | @dport | 0..1 | unsignedShort |
| | | @PLPID | 0..1 | unsignedByte |
| | LS | | 1..N | |
| | | @tsi | 1 | unsignedInt |
| | | @PLPID | 0..1 | unsignedByte |
| | | @bw | 0..1 | unsignedInt |
| | | @startTime | 0..1 | dateTime |
| | | @endTime | 0..1 | dateTime |
| | | ScrFlow | 0..1 | scrFlowType |
| | | RepairFlow | 0..1 | rprFlowType | t4020

FIG. 5

| Element or Attribute Name | Use |
|---|---|
| bundleDescription | |
|   userServiceDescription | |
|     @globalServiceID | M |
|     @serviceID | M |
|     Name | 0..N |
|       @lang | CM |
|     serviceLanguage | 0..N |
|     contentAdvisoryRating | 0..1 |
|     Channel | 1 |
|       @serviceGenre | 0..1 |
|       @serviceIcon | 1 |
|       ServiceDescription | 0..N |
|         @serviceDescrText | 1 |
|         @serviceDescrLang | 0..1 |
|     mpuComponent | 0..1 |
|       @mmtPackageId | 1 |
|       @nextMmtPackageId | 0..1 |
|     routeComponent | 0..1 |
|       @sTSIDUri | 1 |
|       @sTSIDDestinationIpAddress | 0..1 |
|       @sTSIDDestinationUdpPort | 1 |
|       @sTSIDSourceIpAddress | 1 |
|       @sTSIDMajorProtocolVersion | 0..1 |
|       @sTSIDMinorProtocolVersion | 0..1 |
|     broadbandComponent | 0..1 |
|       @fullMPDUri | 1 |
|     ComponentInfo | 1..N |
|       @ComponentType | 1 |
|       @ComponentRole | 1 |
|       @ComponentProtectedFlag | 0..1 |
|       @ComponentId | 1 |
|       @ComponentName | 0..1 |

FIG. 8
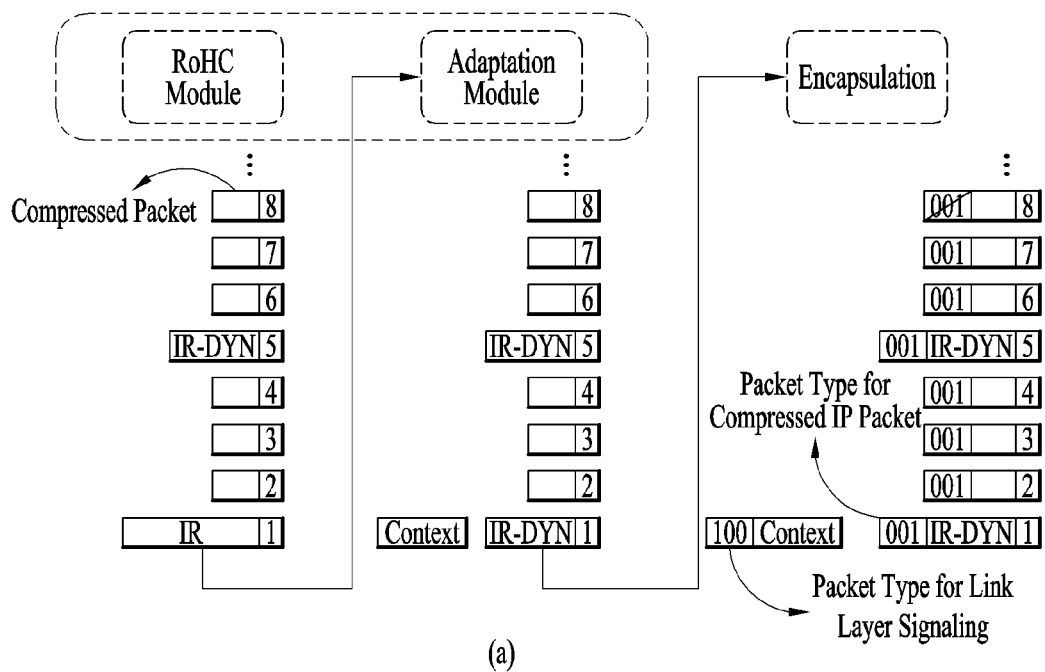
(a)
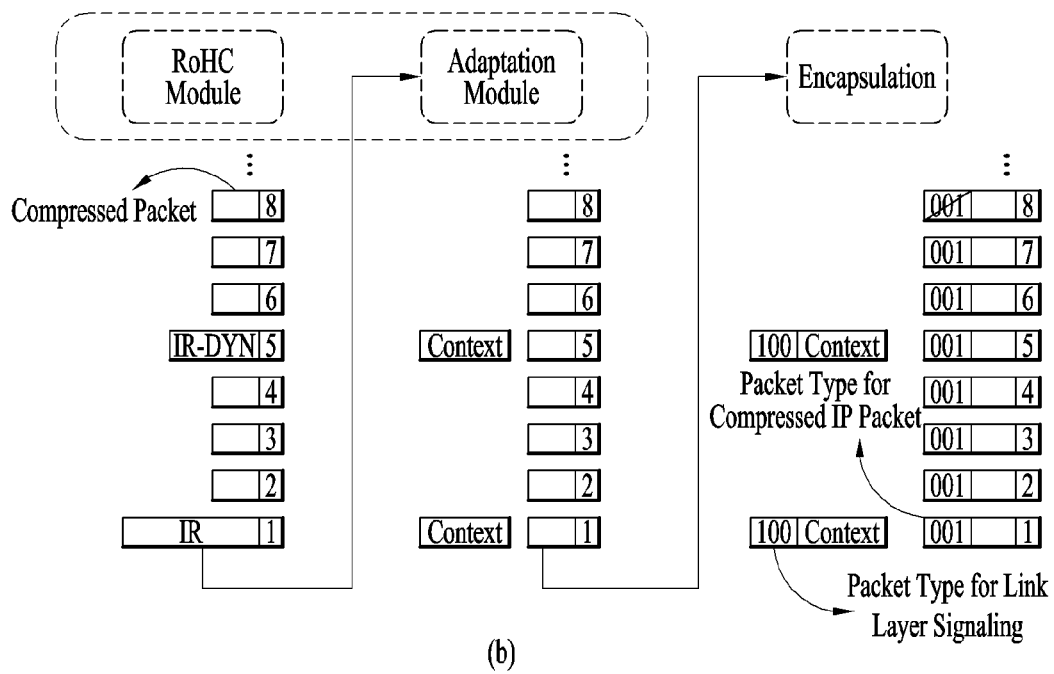
(b)

FIG. 10

| packet_type Value | Meaning |
|---|---|
| 000 | IPv4 packet |
| 001 | Reserved |
| 010 | Compressed IP packet |
| 011 | Reserved |
| 100 | Link layer signaling packet |
| 101 | Reserved |
| 110 | Packet Type Extension |
| 111 | MPEG-2 Transport Stream |

FIG. 12

| Syntax | Number of bits | Format |
|---|---|---|
| Signaling_information_hdr() { | | |
|     signaling_type | 8 | uimsbf |
|     signaling_type_extension | 16 | bslbf |
|     signaling_version | 8 | uimsbf |
|     signaling_format | 2 | uimsbf |
|     signaling_encoding | 2 | uimsbf |
|     reserved | 4 | "1111" |
| } | | |

FIG. 13

| Syntax | Number of bits | Format |
|---|---|---|
| Link_Mapping_Table() { | | |
|   PLP_ID | 6 | uimsbf |
|   Reserved | 2 | |
|   num_session | 8 | uimsbf |
|   for(i = 0 ; i < num_session ; i + +) { | | |
|     src_IP_add | 32 | uimsbf |
|     dst_IP_add | 32 | uimsbf |
|     src_UDP_port | 16 | uimsbf |
|     dst_UDP_port | 16 | uimsbf |
|     SID_flag | 1 | bslbf |
|     compressed_flag | 1 | bslbf |
|     reserved | 6 | '000000' |
|     if (SID_flag = = "1") { | | |
|       SID | 8 | uimsbf |
|     } | | |
|     if (compressed_flag = = "1') { | | |
|       context_id | 8 | uimsbf |
|     } | | |
|   } | | |
| } | | |

FIG. 14

| Syntax | Number of bits | Format |
|---|---|---|
| ROHC-U_description_table { | | |
|   PLP_ID | 6 | uimsbf |
|   max_CID | 8 | uimsbf |
|   adaptation_mode | 2 | uimsbf |
|   context_config | 2 | bslbf |
|   reserved | 6 | '111111' |
|   num_context | 8 | uimsbf |
|   for (i=0; i<num_context; i++) | | |
|     context_id | 8 | uimsbf |
|     context_profile | 8 | uimsbf |
|     if (context_config = = 1){ | | |
|       context_length | 8 | uimsbf |
|       static_chain_byte () | var | uimsbf |
|     } | | |
|     else if (context_config = 0X02) { | | |
|       context_length | 8 | uimsbf |
|       dynamic_chain_byte () | var | uimsbf |
|     } | | |
|     else if (context_config = 0x03) { | | |
|       context_length | 8 | uimsbf |
|       static_chain_byte () | var | uimsbf |
|       dynamic_chain_byte () | var | uimsbf |
|     } | | |
|   } | | |
| } | | |

FIG. 37

| Fields in Additional Header for Signaling | No. of bits | Value |
|---|---|---|
| signaling_type | 8 | 0x02 |
| signaling_type_extension | 16 | 0x0000 |
| signaling_format | 2 | 00 |
| signaling_encoding | 2 | 00 |

FIG. 38

| Fields in Additional Header for Signaling | No. of bits | Value |
|---|---|---|
| signaling_type | 8 | 0x02 |
| signaling_type_extension | 16 | 0xFFFF |
| signaling_format | 2 | 00 |
| signaling_encoding | 2 | 00 |

FIG. 39

| Syntax | No. of bits | Format |
|---|---|---|
| ROHC-U_description_table() { | | |
|     PLP_ID | 6 | uimsbf |
|     max_CID | 8 | uimsbf |
|     adaptation_mode | 2 | uimsbf |
|     context_config | 2 | bslbf |
|     reserved | 2 | '111111' |
|     num_context | 8 | uimsbf |
|     for (i=0; i<num_context; i++) { | | |
|         context_id | 8 | uimsbf |
|         context_profile | 8 | uimsbf |
|         if (context_config == 0) { | | |
|             context_length | 8 | uimsbf |
|             catalog_RDT_context() | var | uimsbf |
|         } | | |
|         else if (context_config == 1) { | | |
|             context_length | 8 | uimsbf |
|             static_chain_byte() | var | uimsbf |
|         } | | |
|         else if (context_config == 2) { | | |
|             context_length | 8 | uimsbf |
|             static_chain_byte() | var | uimsbf |
|         } | | |
|         else if (context_config == 3) { | | |
|             context_length | 8 | uimsbf |
|             static_chain_byte() | var | uimsbf |
|             dynamic_chain_byte() | var | uimsbf |
|         } | | |
|     } | | |
| } | | |

FIG. 40

| Syntax | No. of bits | Format |
|---|---|---|
| ROHC-U_description_table() { | | |
|     PLP_ID | 6 | uimsbf |
|     max_CID | 8 | uimsbf |
|     adaptation_mode | 2 | uimsbf |
|     context_config | 2 | bslbf |
|     RDT_type | 4 | uimsbf |
|     reserved | 2 | '11' |
|     num_context | 8 | uimsbf |
|     for (i=0; i<num_context; i++) { | | |
|         context_id | 8 | uimsbf |
|         context_profile | 8 | uimsbf |
|         if (context_config == 1) { | 8 | uimsbf |
|             context_length | var | uimsbf |
|             static_chain_byte() | | |
|         } | | |
|         else if (context_config == 2) { | 8 | uimsbf |
|             context_length | var | uimsbf |
|             dynamic_chain_byte() | | |
|         } | | |
|         else if (context_config == 3) { | | |
|             context_length | 8 | uimsbf |
|             static_chain_byte() | var | uimsbf |
|             dynamic_chain_byte() | var | uimsbf |
|         } | | |
|     } | | |
| } | | |

FIG. 41

| RDT_type | Meaning |
|---|---|
| 0000 | Catalog RDT |
| 0001 | Discrete RDT |
| other value | Reserved |

BROADCAST SIGNAL TRANSMISSION DEVICE, BROADCAST SIGNAL TRANSMISSION METHOD, BROADCAST SIGNAL RECEPTION DEVICE, AND BROADCAST SIGNAL RECEPTION METHOD

This is the National Stage filing under 35 U.S.C. 371 of International Application No. PCT/KR2018/013655, filed on Nov. 9, 2018, and claims the benefit of and priority to Provisional Application Nos. 62/584,109, filed Nov. 9, 2017, and 62/614,915, filed Jan. 8, 2018, all of which are incorporated by reference in their entirety herein.

TECHNICAL FIELD

The present disclosure relates to a broadcast signal transmission device, a broadcast signal transmission method, a broadcast signal reception device, and a broadcast signal reception method, and more particularly, to broadcast signal transmission/reception devices and methods for processing data in a link layer.

BACKGROUND ART

As analog broadcast signal transmission is terminated, various technologies for transmitting and receiving a digital broadcast signal have been developed. A digital broadcast signal is capable of containing a larger amount of video/audio data than an analog broadcast signal and further containing various types of additional data as well as the video/audio data.

That is, a digital broadcast system may provide a high definition (HD) image, multi-channel audio, and various additional services. However, for digital broadcasting, network flexibility needs to be enhanced in consideration of data transmission efficiency for a large amount of data transmission, robustness of a transceiving network, and a mobile receiving device.

DISCLOSURE

Technical Problem

An object of the present disclosure is to provide a broadcast signal transmission device, a broadcast signal transmission method, a broadcast signal reception device, and a broadcast signal reception method, which are intended to efficiently compress and decompress a packet header for a large amount of data transmission and overhead reduction.

Another object of the present disclosure is to provide a broadcast signal transmission device, a broadcast signal transmission method, a broadcast signal reception device, and a broadcast signal reception method, which are intended to efficiently compress and decompress a header of Internet protocol (IP) packet.

Other object of the present disclosure is to provide a broadcast signal transmission device, a broadcast signal transmission method, a broadcast signal reception device, and a broadcast signal reception method, which are intended to efficiently process data in a link layer.

Technical Solution

A broadcast signal transmission method according to one embodiment of the present disclosure comprises an IP layer processing step of generating Internet protocol (IP) packets including broadcast data and generating fragmented IP packets by fragmenting at least one IP packet of the IP packets in order to transmit to a link layer; a first link layer processing step of restoring the at least one IP packet by combining the fragmented IP packets of the IP packets output at the IP layer processing step; a second link layer processing step of performing header compression of IP packets including the restored at least one IP packet; and a third link layer processing step of encapsulating the header compressed IP packets into at least one link layer packet and transmitting the at least one link layer packet to a physical layer.

In one embodiment, the IP layer processing step includes splitting the at least one IP packet into fragments and generating the fragmented IP packets by adding an IP header to each fragment if a length of the at least one IP packet is longer than a maximum transmission unit (MTU).

In one embodiment, the first link layer processing step includes collecting the fragmented IP packets and restoring the at least one IP packet by combining the collected fragmented IP packets based on a don't fragment (DF) flag, a more fragment (MF) flag, an identification field, and a fragment offset field within an IP header of the IP packets which are input.

In one embodiment, the second link layer processing step includes generating a robust header compression (RoHC) packet stream by performing header compression by applying a RoHC scheme to the IP packets which are input.

In one embodiment, the second link layer processing step includes extracting context information from the RoHC packet stream and transmitting the extracted context information and information related to the header compression through a RoHC-U Description Table (RDT).

A broadcast signal transmission device according to one embodiment of the present disclosure comprises a studio for generating Internet protocol (IP) packets including broadcast data and generating fragmented IP packets by fragmenting at least one IP packet of the IP packets in order to transmit to a link layer; a broadcast gateway of the link layer for restoring the at least one IP packet by combining the fragmented IP packets of the IP packets output from the studio, performing header compression of IP packets including the restored at least one IP packet, encapsulating the header compressed IP packets into at least one link layer packet, and then transmitting the at least one link layer packet to a physical layer; and a transmitter for transmitting the at least one link layer packet transmitted from the broadcast gateway through physical layer processing.

Advantageous Effects

According to the present disclosure, an IP header compression procedure may be simplified to reduce complexity of a broadcast system.

According to the present disclosure, an IP fragmentation procedure applied to a transmission system may be prohibited before transmission to a reception system, whereby implementation of the reception system may be simplified.

According to the present disclosure, bandwidth reduction of IP header compression may be enhanced effectively.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 3 is a diagram showing a low level signaling (LLS) table and a service list table (SLT) according to an embodiment of the present disclosure;

FIG. 4 is a diagram showing a USBD and an S-TSID delivered through ROUTE according to an embodiment of the present disclosure;

FIG. 5 is a diagram showing a USBD delivered through an MMT according to an embodiment of the present disclosure;

FIGS. 8(a) and 8(b) are diagrams showing examples of adaptation mode 2 and 3 in IP header compression according to an embodiment of the present disclosure;

FIG. 10 is a diagram showing an embodiment of meanings of code values assigned to a packet_type field of FIG. 9;

FIG. 12 is a diagram illustrating one embodiment of a syntax structure of additional header for signaling information of FIG. 11;

FIG. 13 is a diagram illustrating one embodiment of a syntax structure of an LMT according to the present disclosure;

FIG. 14 is a diagram illustrating one embodiment of a syntax structure of an RDT according to the present disclosure;

FIGS. 24(a), 24(b1) to 24(b3), 24(c) and 24(d) are diagrams illustrating one embodiment of fragmentation applied to some IP packets of FIGS. 23(a) to 23(d);

FIGS. 25(a), 25(b1) to 25(b3), 25(c) and 25(d) are diagrams illustrating one embodiment of header compression and link layer packet encapsulation applied to IP packets of FIGS. 24(a), 24(b1) to 24(b3), 24(c) and 24(d);

FIGS. 29(a), 29(b1) to 29(b3), 29(c) and 29(d) are diagrams illustrating one embodiment of fragmentation applied to some IP packets of FIGS. 28(a) to 28(d);

FIGS. 35(a), 35(b1) to 35(b3), 35(c) and 35(d) are diagrams illustrating one embodiment of fragmentation applied to some IP packets of FIGS. 34(a) to 34(d);

FIG. 37 is a diagram illustrating one embodiment of a syntax structure of additional header for signaling information according to the present disclosure;

FIG. 38 is a diagram illustrating another embodiment of a syntax structure of additional header for signaling information according to the present disclosure;

FIG. 39 is a diagram illustrating another embodiment of a syntax structure of an RDT according to the present disclosure;

FIG. 40 is a diagram illustrating other embodiment of a syntax structure of an RDT according to the present disclosure; and FIG. 41 is a diagram illustrating one embodiment of the present disclosure of code values allocated to an RDT_type field of FIG. 40.

BEST MODE FOR CARRYING OUT THE DISCLOSURE

Figure 1:
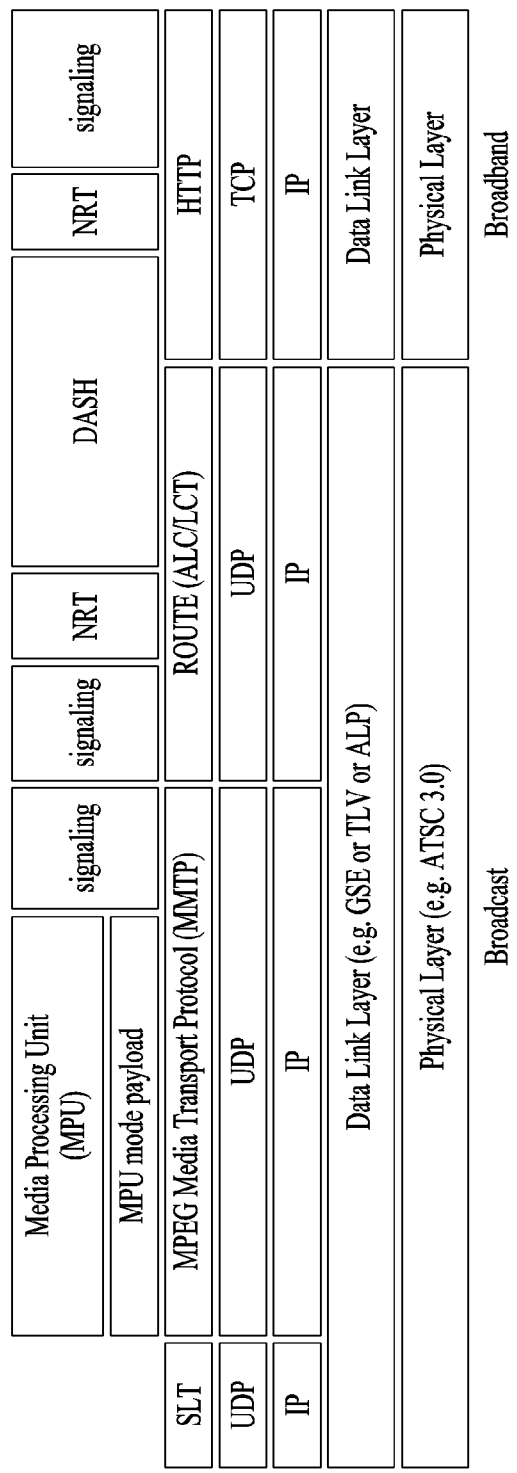
FIG. 1 is a diagram showing a protocol stack according to an embodiment of the present disclosure.

Reference will now be made in detail to the preferred embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

Although the terms used in this specification are selected from generally known and used terms considering their functions in the present specification, the terms may be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

Specific structural or functional descriptions in the embodiments disclosed in this specification are intended to describe the embodiments, and the embodiments can be carried out in various forms and it should not be understood that the scope of the disclosure is limited by the embodiments described in this specification.

Since the embodiments according to the present specification may be carried out in other specific ways and various modifications may be made in the embodiments, specific embodiments will be illustrated in the drawings and will be described in detail in this specification. However, this is not intended to limit the embodiments according to the present specification to a specific disclosed type, and it is to be understood that the embodiments according to the present specification include all changes, equivalents, or replacements included in spirits and technical scope of the present specification.

Although the terms such as "first" and/or "second" in this specification may be used to describe various elements, it is to be understood that the elements are not limited by such terms. The terms may be used to identify one element from another element. For example, the first element may be referred to as the second element, and vice versa within the range that does not depart from the scope of the present specification.

In the specification, when a part "comprises" or "includes" an element, it means that the part further comprises or includes another element unless otherwise mentioned. Also, the term " . . . module (or unit)" disclosed in the specification means a unit for processing at least one function or operation, and may be implemented by hardware, software or combination of hardware and software.

In this specification, 'signaling' indicates that service information (SI) provided from a broadcast system, Internet broadcast system and/or Internet combined system is transmitted/received. The service information includes broadcast service information (for example, ATSC-SI and/or DVB-SI) provided from each broadcast system which currently exists.

In this specification, 'broadcast signal' is defined to include signal and/or data provided from bidirectional broadcasting such as Internet broadcasting, broadband broadcasting, communication broadcasting, data broadcasting and/or video on demand (VOD) in addition to terrestrial broadcasting, cable broadcasting, satellite broadcasting and/or mobile broadcasting.

In this specification, a 'Physical Layer Pipe (PLP)' means a certain unit that transmits data belonging to a physical layer. Therefore, the PLP in this specification may be referred to as a 'data unit' or a 'data pipe'.

As one of powerful applications to be used for digital broadcasting (DTV) services, there may be a hybrid broadcast service through interaction between a broadcast network and Internet network. The hybrid broadcast service may allow a user to experience various contents by transmitting enhancement data associated with broadcast audio/video (A/V) contents transmitted through a terrestrial broadcast network or some of broadcast A/V contents through Internet network (or broadband) in real time.

The present disclosure is intended to provide a broadcast transmission device, a broadcast signal reception device, a broadcast transmission method and a broadcast reception method, which are capable of transmitting and receiving a broadcast signal for an advanced broadcast service. The advanced broadcast service according to one embodiment of the present disclosure includes a terrestrial broadcast service, a mobile broadcast service, and ultra-high definition television (UHDTV) service.

In one embodiment of the present disclosure, the broadcast signal for the advanced broadcast service is processed in a non-MIMO (multi input multi output) scheme or a MIMO scheme. The non-MIMO scheme according to one embodiment of the present disclosure may include a Multi Input Single Output (MISO) scheme, Single Input Single Output (SISO) scheme, etc. Hereinafter, although multiple antennas of MISO or MIMO may be described based on two antennas, for example, the description of the present disclosure may be applied to a system that uses two or more antennas.

Also, in the present disclosure, a signal frame (or frame or A3 frame or physical layer frame) is divided into three regions, and a first region located at the front of the signal frame is referred to as a bootstrap (or bootstrap region), a second region located next to the first region is referred to as a preamble (or preamble region), and a third region located next to the second region is referred to as a data region.

The bootstrap region includes data, and the preamble region includes L1 (Layer 1) signaling data (or L1 control signaling data) applicable to the other of this frame. The data region is divided into one or more subframes. If a plurality of subframes exist in one signal frame, the plurality of subframes are concatenated together in time. One subframe includes a set of time-frequency resources in the signal frame. That is, data transmitted to one or more PLPs are mapped into one or more subframes.

The L1 signaling data provide information required to configure physical layer parameters. The L1 signaling data include L1-Basic signaling data L1-Detail signaling data. At this time, the bootstrap data may be included in the L1 signaling data.

In one embodiment, in the information included in the L1 signaling data which will be described later, information starting with L1B is information included in the L1-Basic signaling data, and information starting with L1D is information included in the L1-Detail signaling data.

The L1-Basic signaling data may correspond to Physical Layer Signaling 1 (PLS1) data, and the L1-Detail signaling data may correspond to PLS2 data.

FIG. 1 is a diagram showing a protocol stack according to an embodiment of present disclosure.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a User Datagram Protocol/Internet Protocol (UDP/IP) layer. In other words, in a UDP/IP layer, a UDP packet is made by adding a UDP header to a UDP payload including data processed according to MMTP or ROUTE protocol and an IP/UDP packet is made by adding an IP header to the UDP packet. In the present disclosure, for convenience of description, an IP/UDP packet will be referred to as an IP packet. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a upper (or higher) layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (upper layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of present disclosure, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of present disclosure, linear service components of one service may be delivered through the MMT protocol. In another embodiment of present disclosure, the linear service components of one service may be delivered through the ROUTE protocol. In another embodiment of present disclosure, the linear service components of one service and NRT data (NRT service components) may be delivered through the ROUTE protocol. In another embodiment of present disclosure, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module (i.e., SLT parser). The SLT parser may parse the SLT and acquire data and generate or update a channel map based on the acquired data. The receiver may acquire and deliver bootstrap information of the SLT to a ROUTE or MMT client. The receiver may acquire and store an SLS. USBD may be acquired and parsed by a signaling parser.

Figure 2:
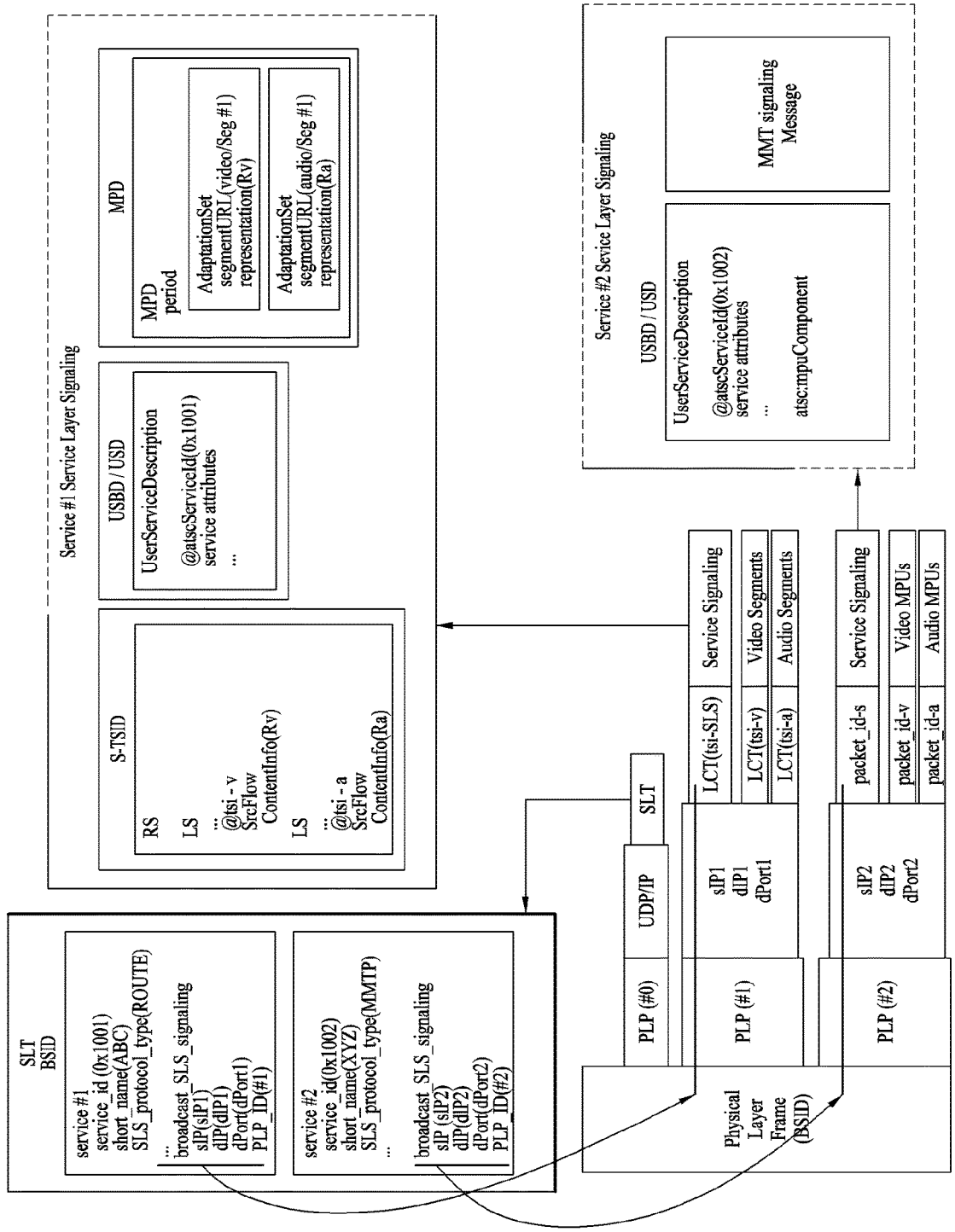
FIG. 2 is a diagram showing a service discovery procedure according to an embodiment of the present disclosure.

FIG. 2 is a diagram showing a service discovery procedure according to one embodiment of present disclosure.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/USD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of present disclosure.

One embodiment t3010 of the LLS table may include information according to an LLS_table_id field, a provider_id field, an LLS_table_version field and/or an LLS_table_id field. The LLS table may further include an LLS_group_id field and a group_count_minus1 field.

The LLS_table_id field may identify a type of table delivered in the body, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table. In one embodiment, a value of this field is increased as much as 1 whenever data of the table identified by combination of the LLS_table_id field and the LLS_group_id field are changed.

According to a value of the LLS_table_id field, the LLS table may include at least one of the SLT, a Rating Region Table (RRT) including information related to a content advisory rating, system time information for providing information related to a system time, and a Common Alert Protocol (CAP) message for providing information related to emergency alert. The LLS table may include an Advanced Emergency Alerting Table (AEAT) fragment conforming to an Advanced Emergency Alerting Message Format (AEA-MF) structure instead of the CAP message. The AEAT fragment may include the CAP message. According to embodiments, the LLS table may further include the other information aside from these information.

The LLS_group_id field may associate the LLS table (LLS_table ( )) with tables of a group having the same LLS_group_id. The scope of this field is a broadcast stream. That is, a value of the LLS_group_id field shall be unique within the broadcast stream.

The group_count_minus1 field indicates one less than the total number of different LLS table groups of tables in a link layer packet stream carried in a current LLS packet stream or a specific PLP. For example, a value 0 indicates that LLS_table( )s carrying only one value of LLS_group_id is present, and a value of 1 indicates that LLS_table( )s carrying two values of LLS_group_id are present.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element. The Service element may further include an @globalserviceID attribute.

The @serviceId attribute is the identifier of the service and the @globalserviceID attribute is a globally unique URI value that represents the identity of the service. The @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service. The Service attribute may include an @essential element. The @essential element indicates whether an essential portion of this service is delivered via this broadcast stream.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of present disclosure.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of present disclosure.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. The userServiceDescription element may further include an @servicestatus attribute and otherRatings element.

Each field may be omitted according to the value of the shown Use column or a plurality of fields may be present.

The @globalServiceID attribute, the @serviceId attribute, the @servicestatus, the Name element and the serviceLanguage element may be equal to the fields of the USBD delivered through ROUTE. The contentAdvisoryRating element may indicate the RRT-based content advisory rating of the service. The otherRatings element may indicate non-RRT content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute, an @contentIdSchemeIdUri attribute, an @contentIdValue attribute, an @nextMmtPackageId attribute, an @nextcontentIdSchemeIdUri attribute, an and/or @nextcontentIdValue attribute. The @mmtPackageId attribute may reference the MMT package of the service components delivered as the MPU of the service. The @contentIdSchemeIdUri attribute may indicate URI to identify a scheme of a content ID related to the current MMT package. The @contentIdValue attribute may indicate a value of a content ID related to the current MMT package. The @nextMmtPackageId attribute may reference an MMT package to be used after the MMT package referenced by the @mmtPackageId attribute in terms of time. The @nextcontentIdSchemeIdUri attribute may indicate URI to identify a scheme of a content ID related to the next MMT package. The @nextcontentIdValue attribute may indicate a value of a content ID related to the next MMT package. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID.

That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset_id (asset ID) of the MP table corresponding to this service component. The @componentName attribute may indicate the name of the service component.

As described above, in an embodiment of the present disclosure, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present disclosure, bootstrapping of an ESG service may be performed by a broadcast or broadband network. By acquiring the ESG over broadband, URL information of the SLT may be used. ESG information may be requested using this URL.

In another embodiment of the present disclosure, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present disclosure, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present disclosure, through a TOI field of the LCT packets delivered through the LCT channel delivering the SLS, which SLS fragment is delivered using the LCT packets (USBD, S-TSID, MPD, etc.) may be identified.

In another embodiment of the present disclosure, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present disclosure, an AEAT may be included and provided in the above-described LLS table for emergency alert. Rich media content for emergency alert may also be provided. Rich media may be signaled by an AEAT and, if rich media is present, the rich media may be provided as an EAS service signaled by the SLT.

In another embodiment of the present disclosure, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present disclosure, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

Hereinafter, link layer will be described.

Figure 6:
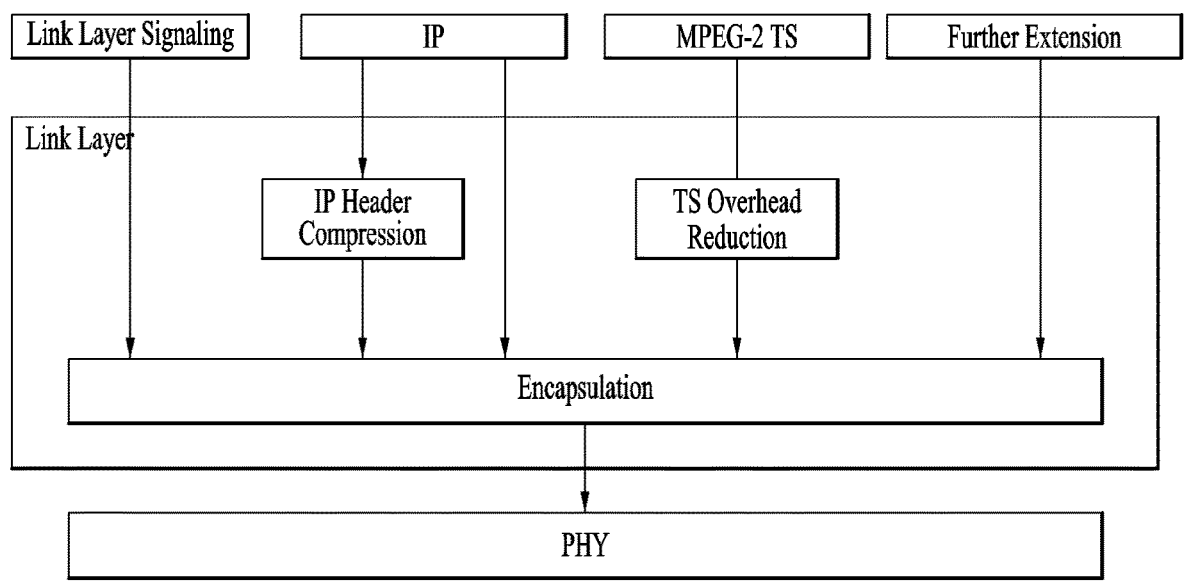
FIG. 6 is a diagram showing a link layer protocol architecture according to an embodiment of the present disclosure.
Figure 7:
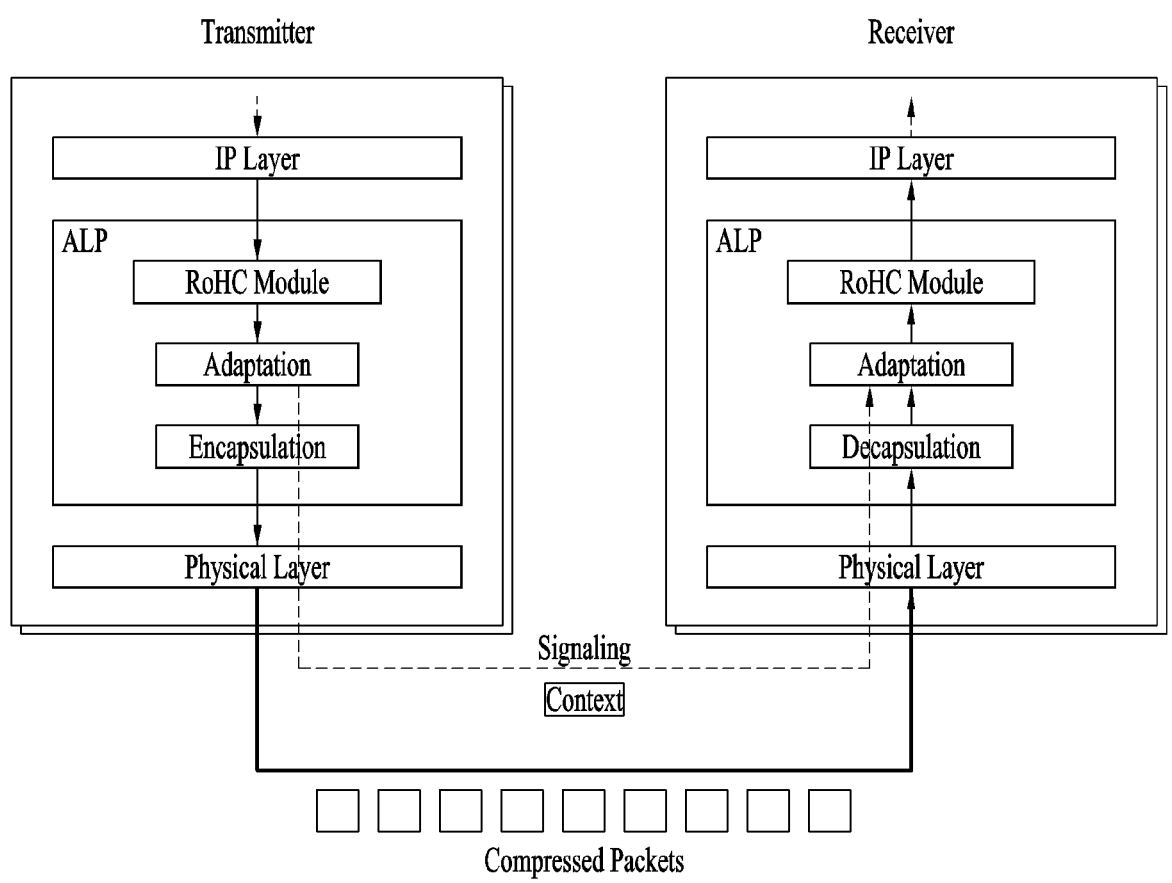
FIG. 7 is a diagram showing link layer operation according to an embodiment of the present disclosure.

FIG. 6 is a diagram showing a link layer protocol architecture according to an embodiment of the present disclosure. FIG. 7 is a diagram of the present disclosure showing link layer operation when an input packet is an IP packet.

The link layer may be a layer between a physical layer and a network layer. A transmission side may transmit data from the network layer to the physical layer and a reception side may transmit data from the physical layer to the network layer. The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to present disclosure may provide IP overhead reduction and/or MPEG-2 TS overhead reduction.

When IP packets are input as input packets, the link layer may sequentially perform IP header compression, adaptation and/or encapsulation as shown in FIG. 7. In some embodiments, some processes may be omitted. For example, the RoHC module may perform IP packet header compression to reduce unnecessary overhead. Context information may be extracted by performing the adaptation procedure in an adaptation module and transmitted out of band. The IP header compression and adaption procedure may be collectively referred to as IP header compression. Thereafter, the IP packets and/or the header compressed packets and/or context information may be encapsulated into link layer packets by performing the encapsulation procedure in an encapsulation module. When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

Next, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

A transmitter may include an RoHC module (or header compressor) and/or an adaptation module for IP header compression as shown in FIG. 7. The RoHC module may reduce the size of headers of IP packets based on a RoHC method. Then, adaptation module may extract context information from the header compressed IP packets and generate signaling information related to header compression. A receiver may recover packet headers based on signaling information and context information to reconfigure original IP packets. Hereinafter, IP header compression may mean only IP header compression by an RoHC module and may be a concept that combines IP header compression by the RoHC module and the adaptation procedure by the adaptation module. This may be the same as in decompressing of the receiver.

In the present disclosure, for convenience of description, IP packets prior to compression will be referred to as data packets, and packets after compression in RoHC type will be referred to as RoHC packets (or header compressed data packets). A stream including IP packets prior to compression will be referred to as an IP stream or an IP packet stream, and a stream including RoHC packets will be referred to as an RoHC packet stream or an RoHC IP stream.

In one embodiment, an IP version, a source IP address, a destination IP address, an IP fragment flag, a source port number, a destination port number of information included in an IP header and a UDP header of an IP packet are little changed during IP streaming. In the present disclosure, fields for transmitting information which is little changed during streaming will be referred to as static fields. Also, information transmitted to the static fields will be referred to as static information. In the present disclosure, the static information is used to refer to static chain information.

In RoHC compression, after such static information is transmitted once, additional information is not performed for a while. This will be referred to as Initialization and Refresh (IR) state, and an RoHC packet for transmitting the static information to the header will be referred to as an IR packet. In addition, additional transmission is separately performed for dynamic information frequently changed but maintained for a certain time. The dynamic information is transmitted through a dynamic field, and is used to mean the same as the dynamic chain information in the present disclosure.

An RoHC packet for transmitting the dynamic information to the header will be referred to as an IR-DYN packet. In one embodiment, the IR packet also includes dynamic information. That is, since the IR packet and the IR-DYN packet include all kinds of information, the packets have a size similar to that of the existing header.

The other packets except the IR Packet and the IR-DYN packet of the RoHC packets will be referred to as compressed packets. In one embodiment, a header of each compressed packet (or compression packet) includes 1-2 byte information only. Hereinafter, adaptation will be described.

In case of transmission through a unidirectional link, if a receiver does not have context information, a decompressor of the receiver cannot restore the received packet header until a complete context is received. This may cause channel change delay and turn-on delay. Therefore, configuration parameters between compressor/decompressor and context information may be transmitted in out-of-band through an adaptation function. The adaptation function may construct link layer signaling by using the context information and/or the configuration parameters. That is, out-of-band transmission may be performed link layer signaling. In other words, the adaptation function is used to reduce a decompression error caused by loss of the context information and error change delay. In the present disclosure, link layer signaling and link layer signaling information are used to mean the same.

Hereinafter, extraction of the context information will be described.

The context information is extracted from the header compressed IP packets, that is, the RoHC packets, and various methods may be used in accordance with an adaptation mode.

FIGS. 8(a) and 8(b) are diagrams illustrating a procedure of extracting and processing context information when an adaptation mode is 2 and when an adaptation mode is 3.

Adaptation mode 1 is a mode for not performing any operation for basic RoHC packet stream (that is, RoHC packet flow). In this mode, an adaptation module may operate as a buffer. In other words, in the adaptation mode 1, context information is not extracted from the RoHC packets. The RoHC packets in RoHC packet flow are encapsulated into at least one ALP packet in an encapsulation module and then transmitted to a physical layer.

In the adaptation mode 2 of FIG. 8(a), the adaptation module detects the IR packet from the RoHC packet flow, and extract context information (that is, static chain information) from a header of the detected IR packet. In one embodiment, the IR packet from which the context information is extracted is converted to an IR-DYN packet, wherein the IR-DYN packet is replaced with original IR packet and transmitted to the encapsulation module in the same order in the RoHC packet flow. In one embodiment, the extracted context information is transmitted to the encapsulation module by being included a RoHC-U Description Table (RDT) of link layer signaling information. The encapsulation module encapsulates packets in the RoHC packet flow into at least one ALP packet, and encapsulates the link layer signaling information into at least one ALP packet and transmits the ALP packets to the physical layer. A PLP for transmitting at least one ALP packet including the RoHC packet flow may be different from or the same as a PLP for transmitting at least one ALP packet including the link layer signaling information.

In the adaptation mode 3 of FIG. 8(b), the adaptation module detects the IR packet and the IR-DYN packet from the RoHC packet flow, and extract context information from the detected IR and IR-DYN packets. In one embodiment, the context information extracted from the IR packet is static chain information and dynamic chain information, and the context information extracted from the IR-DYN packet is dynamic chain information. The IR and IR-DYN packets from which the context information is extracted are converted to compressed packets. The converted compressed packets may be replaced by the original IR and IR-DYN packets and transmitted in the RoHC packet flow in the same order. In one embodiment, the extracted context information is transmitted to the encapsulation module by being included the RDT of the link layer signaling information. The encapsulation module encapsulates packets in the RoHC packet flow into at least one ALP packet, and encapsulates the link layer signaling information into at least one ALP packet and transmits the ALP packets to the physical layer. A PLP for transmitting at least one ALP packet including the RoHC packet flow may be different from or the same as a PLP for transmitting at least one ALP packet including the link layer signaling information. At least one ALP packet including the link layer signaling information may be transmitted through a specific physical data path. In some embodiments, the specific physical data path may mean one of general PLPs or a PLP to which low level signaling (LLS) is forwarded, or may mean a dedicated PLP or L1 signaling path.

In this case, the RDT may be signaling information including information (or header compression information) related to header compression and/or context information (static chain and/or dynamic chain). In some embodiments, the RDT may be transmitted whenever the context information is changed. Also, in some embodiments, the RDT may be transmitted from every physical frame. To transmit the RDT from every physical frame, a previous RDT may be reused.

Hereinafter, packet encapsulation will be described.

A link layer protocol, that is, the encapsulation module may encapsulate all types of input packets such as IP packets and TS packets into at least one link layer packet. Through this case, the physical layer has only to process one packet format independently from a protocol type of a network layer (in this case, MPEG-2 TS packet may be considered as a type of a network layer packet). That is, each network layer packet or input packet is modified to payload of a generic link layer packet in the encapsulation module.

Segmentation may be used during the packet encapsulation procedure. If the network layer packet is too large to be processed by the physical layer, the network layer packet may be split into two or more segments. The link layer packet header may include fields for executing segmentation in a transmitting side and recombining in a receiving side. The segments may be encapsulated into link layer packets in the same order as the original position.

Concatenation may also be used during the packet encapsulation procedure. If the network layer packet is enough small so that the payload of the link layer packet includes several network layer packets, concatenation may be performed. The link layer packet header may include fields for executing concatenation. In case of concatenation, input packets may be encapsulated into a payload of the link layer packet in the same order as the original input order.

One link layer packet may include a header and a payload, wherein the header may include a base header, additional header and/or optional header. The additional header may further be added depending on the status of concatenation or segmentation, and necessary fields suitable for the status may be included in the additional header. Also, the optional header may further be added for additional information delivery. The presence of the optional header is indicated by a flag field of the additional header. In some embodiments, a field indicating the presence of the additional header and the optional header may be located in the base header.

Figure 9:
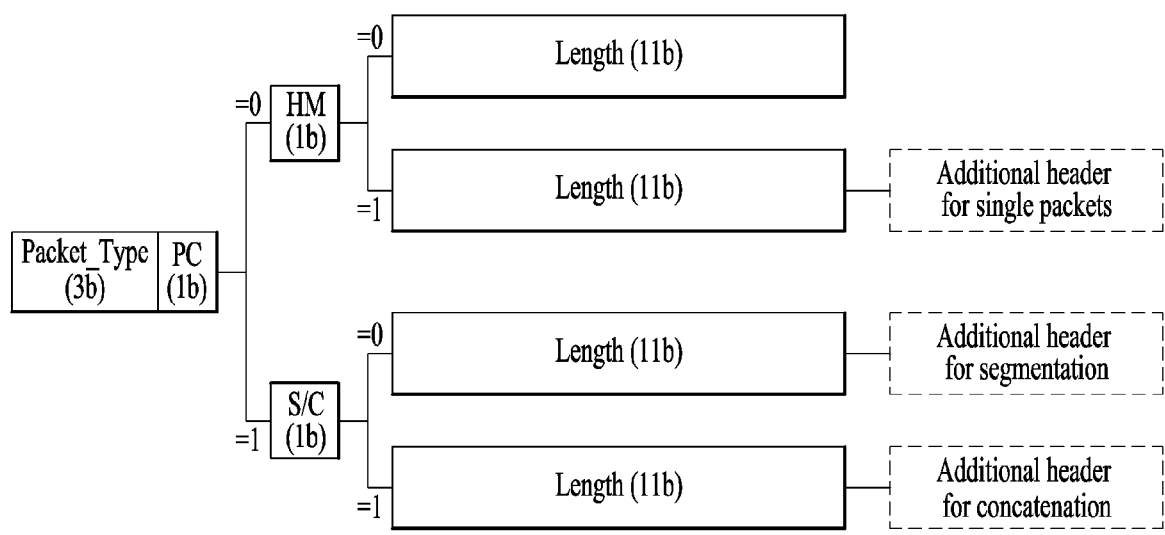
FIG. 9 is a diagram showing a structure of a base header of a link layer packet according to an embodiment of the present disclosure.

FIG. 9 is a diagram illustrating a base header structure of a link layer packet according to one embodiment of the present disclosure.

The base header of the link layer packet has a hierarchical structure. The base header may have a length of 2 bytes corresponding to a minimum length of the link layer picketer header.

The base header according to one embodiment of the present disclosure may include a packet_type field of 3 bits, a PC field of 1 bit, and/or a length field of 11 bits. In some embodiments, the base header may further include an HM field or S/C field of 1 bit.

FIG. 10 is a table illustrating embodiments of code values allocated to a packet_type field.

The packet_type field indicates an original protocol or a packet type of input data prior encapsulation into the link layer packet as shown in FIG. 10. That is, IPv4 packet, compressed IP packet, link layer signaling packet and the other types of packets may be encapsulated with such a base header structure. However, in some embodiments, MPEG-2 TS packet may be encapsulated with a specific structure different from the base header structure. If the packet_type has a value of "000", "010", "100" or "110", the original data type of ALP packet is one of IPv4 packet, compressed IP packet, link layer signaling packet or extension packet. If the MPEG-2 TS packet is capsulated, the value of the packet_type may be "111". The other values of the packet_type field may be reserved for future use.

The Payload_Configuration (PC) field indicates a configuration of a payload. A value of 0 indicates that the link layer packet delivers one whole input packet and next field is Header_Mode. A value of 1 indicates that the link layer packet delivers one or more input packets (concatenations) or some of great input packets (segmentation) and next field is Segmentation_Concatenation.

If the Header_Mode (HM) field is set to 0, it indicates that there is no additional header and indicates that a payload length of the link layer packet is shorter than 2048 bytes. This value may be varied depending on embodiments. The value of 1 indicates that additional header exists next to the length field. In this case, the length of the payload may be greater than 2047 bytes/or optional features (substream identification, header extension, etc.) may be used. This value may be varied depending on embodiments. This field may exist only if the Payload_Configuration field of the link layer packet has a value of 0.

If the Segmentation_Concatenation (S/C) field is set to 0, it indicates that the payload delivers segments of input packets and additional header for segmentation exists next to the length field. A value of 1 indicates that the payload delivers complete input packets having payloads more than 0 and additional header for concatenation exists next to the length field. This field may exist only if the Payload_Configuration field of the ALP packet has a value of 1.

The length field may indicate 11 lower bits (that is, 11 least significant bits (LSBs)) of a byte unit length of the payload delivered by the corresponding link layer packet. If a Length_MSB field exists in additional header, the length field is concatenated in the Length_MSB field and becomes the LSB to provide an actual total length of the payload. The number of bits of the length field may be changed to other bits in addition to 11 bits.

Therefore, types of the following packet structures are available. That is, a single packet having no additional header, a single packet having additional header, a segmented packet, and a concatenated packet are available. In some embodiments, more packet configurations may be available by additional header, optional header, combination of additional header for signaling information and additional header for type extension, which will be described later.

Figure 11:
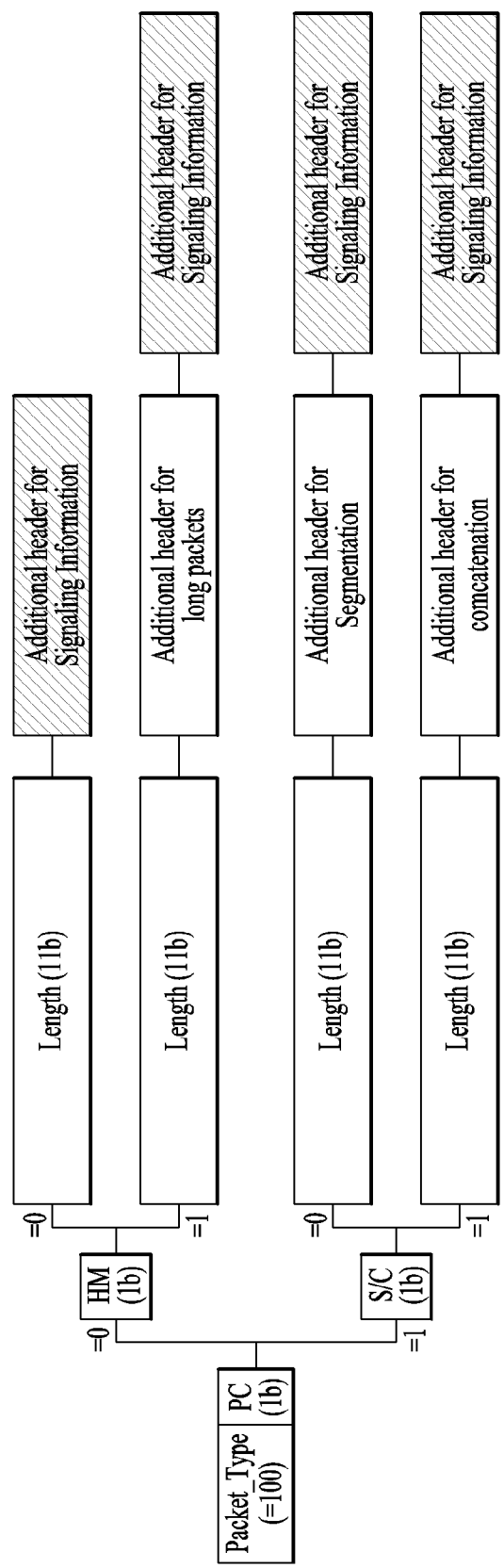
FIG. 11 is a diagram illustrating additional header structure for signaling information of a link layer packet according to another embodiment of the present disclosure.

FIG. 11 is a diagram illustrating additional header structure of a link layer packet for signaling information according to one embodiment of the present disclosure.

That is, how link layer signaling is incorporated into the link layer packet is as follows. The link layer packet including link layer signaling, that is, signaling packet is identified when the packet_type field of the base header is equal to 100.

In FIG. 11, an oblique portion is additional header for signaling information. That is, in addition to the header shown in FIG. 9, the link layer packet may include two additional portions (that is, additional header for signaling information and actual signaling table). The signaling table is included in the payload of the ALP packet. Therefore, in one embodiment, a total length of the link layer packet including the signaling table is indicated in the link layer packet header.

FIG. 12 is a diagram illustrating one embodiment of a syntax structure of additional header (signaling_information_hdr( )) of the present disclosure. In FIG. 12, some fields may be omitted or added in accordance with embodiments.

A Signaling_Type field is an 8-bit field that may indicate a signaling type. In one embodiment, if a value of the Signaling_Type field is 0x01, it indicates that the signaling table is a Link Mapping Table (LMT), and if a value of the Signaling_Type field is 0x02, it indicates that the signaling table is an RDT.

A Signaling_Type_Extension field is a 16-bit field that may indicate attributes of signaling. Details of the corresponding field may be defined in signaling option.

A Signaling_Version field is an 8-bit field that may indicate a version of signaling. In one embodiment, a value of this field is increased as much as 1 whenever data of signaling identified by the Signaling_type field are changed.

A Signaling_Format field is a 2-bit field that may indicate a data format of signaling data. In this case, the data format may mean binary, XML, etc.

A Signaling_Encoding field is a 2-bit field that may specify encoding/compression format. This field may indicate whether compression has not been performed or specific compression has been performed.

The RDT and the LMT are tables included in link layer signaling and the link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling according to an input path. Internal link layer signaling may be signaling information generated at the link layer. This includes the RDT or the LMT. External link layer signaling may be signaling information received from an external module, an external protocol or a upper layer. An encapsulation module in the link layer may encapsulate link layer signaling into a link layer packet and deliver the link layer packet to a physical layer. At this time, a link layer packet structure (header structure) for link layer signaling may be defined and link layer signaling information may be encapsulated into a link layer packet according to this structure.

FIG. 13 is a diagram showing a syntax structure of a link mapping table (LMT) according to one embodiment of the present disclosure. That is, a signaling table is an LMT, in the additional header for signaling information in the ALP header of the ALP packet, a value of the signaling_type field is 0x01, a value of the signaling_type_extension field is 0xFFFF, a value of the signaling_format field is 00 and a value of the signaling_encoding field is 00.

The LMT may provide a list of upper (or higher) layer sessions carried through the PLP. In addition, the LMT may provide additional information for processing link layer packets carrying the upper layer sessions. Here, the upper layer session may be referred to as multicast. LMT may signal information on IP streams or transport sessions transmitted through a specific PLP. In contrast, LMT may signal information on PLP that a specific transport session is delivered.

The LMT may be transmitted through the PLP identified to deliver the LLS.

Here, the PLP for delivering the LLS may be identified by an L1B_lls_flag field of L1 basic signaling data and an L1D_plp_lls_flag field of L1 detail signaling data of a physical layer. The L1B_lls_flag field indicates the presence or absence of LLS in one or more PLPs in the current frame. In an embodiment, when a value of the L1B_lls_flag field is 0, it indicates there is no LLS in the current frame and when a value of the L1B_lls_flag field is 1, it indicates there is LLS carried in the current frame. The L1D_plp_lls_flag field indicates whether the current PLP carries LLS for each PLP. The purpose of these fields is to allow receivers to quickly locate upper layer signaling information (i.e., LLS). That is, the LMT may also be transmitted through the same PLP along with the LLS. Each LMT may describe mapping between PLPs and IP address/port as described above. As described above, the LLS may include an SLT and, in this regard, the IP address/ports described by the LMT may be any IP address/ports related to any service, described by the SLT transmitted through the PLP such as a corresponding LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT may include a PLP_ID field, a num_session field and/or information on each session. The LMT may describe IP streams transmitted through one PLP and may describe information on a plurality of PLPs by adding a PLP loop. In this case, as described above, the LMT may describe PLPs of all IP addresses/ports related to all service described by the SLT transmitted together using a PLP loop. The sessions in the LMT of FIG. 13 may be the same meaning as multicasts according to embodiments. The LMT may further include a num_PLPs_minus1 field.

The num_PLPs_minus1 field indicates a value one less than the number of PLPs for which multicast-to-PLP mapping is provided in the table. The PLP_ID field may indicate a PLP corresponding to the session. When the PLP loop is used, each PLP_ID field may identify each target PLP. Fields from the PLP_ID field may be included in the PLP loop. Here, the below-described PLP_ID field may be an identifier of one PLP of the PLP loop and the following fields may be fields corresponding to the corresponding PLP.

The num_session field may indicate the number of upper layer sessions delivered through the PLP identified by the PLP_ID field. According to the number indicated by the num_session field, information on each session may be included. This information may include a src_IP_add field, a dst_IP_add field, a src_UDP_port field, a dst_UDP_port field, an SID_flag field, a compressed_flag field, an SID field, and/or a context_id field.

The src_IP_add field, the dst_IP_add field, the src_UDP_port field, and the dst_UDP_port field may indicate the source IP address, the destination IP address, the source UDP port and the destination UDP port of the transport session among the upper layer sessions delivered through the PLP identified by the PLP_ID field.

The SID_flag field may indicate whether the link layer packet delivering the upper layer session identified by the four fields, the Src_IP_add field, the Dst_IP_add field, the Src_UDP_Port field, the Dst_UDP_Port field has an SID field in the optional header. The link layer packet delivering the upper layer session may have an SID field in the optional header and the SID field value may be equal to that of the SID field in the LMT.

The compressed_flag field may indicate whether header compression is applied to the data of the link layer packet delivering the upper layer session identified by the four fields, the Src_IP_add field, the Dst_IP_add field, the Src_UDP_Port field, the Dst_UDP_Port field. In addition, presence/absence of the below-described context_id field may be determined according to the value of this field. When header compression is applied (compressed_flag=1), the RDT may be present and the PLP ID field of the RDT may have the same value as the corresponding PLP_ID field related to the present compressed_flag field.

The SID field may indicate a sub stream ID (SID) of link layer packets for delivering the upper layer session identified by the four fields, the Src_IP_add field, the Dst_IP_add field, the Src_UDP_Port field, the Dst_UDP_Port field. The link layer packets may include the SID having the same value as the present SID field in the optional header. Thereby, the receiver may filter link layer packets using information of the LMT and SID information of a link layer packet header without parsing of all link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present disclosure, the fields, elements or attributes may be omitted or may be replaced with other fields. In some embodiments, additional fields, elements or attributes may be added.

FIG. 14 is a diagram illustrating one embodiment of a syntax structure of a RoHC-U Description Table (RDT) according to one embodiment of the present disclosure. That is, in on embodiment, if the signaling table is an RDT, the signaling_type field value of additional header for signaling information in ALP header of the corresponding ALP packet is 0x02, its signaling_type_extension field value is 0xFFFF, its signaling_format field value is 00, and its signaling_encoding field value is 00.

The RDT of FIG. 14 may include a PLP_ID field, a max_CID field, an adaptation_mode field, a context_config field, a num_context field, a context_id field, a context_profile field, a context_length field, a static_chain_byte ( ) field and/or a dynamic_chain_byte ( ) field.

The PLP_ID field may be an 8-bit field indicating a PLP corresponding to the corresponding RDT table.

The max_CID field indicates a maximum value of context ID used to correspond to this PLP.

The context_id field may be an 8-bit field indicating context ID (CID) of compressed IP streams. In the corresponding system, CID of 8 bits may be used for larger CID.

The context_profile field may be an 8-bit field indicating a range of a protocol (or layer) used to compress IP packets. In the present disclosure, if the context_profile field value is 0, the data packet has a RoHC compression format, or it indicates that actual header information has not been compressed. In one embodiment, if the context_profile field value is 1, it indicates that RoHC compression type has been applied up to RTP, if the context_profile field value is 2, it indicates that RoHC compression type has been applied up to UDP, if the context_profile field value is 3, it indicates that RoHC compression type has been applied up to ESP, and if the context_profile field value is 4, it indicates that RoHC compression type has been applied up to IP. The corresponding field may be omitted.

The adaptation_mode field may be a 2-bit field indicating a mode of the adaptation module in the corresponding PLP. In one embodiment of the present disclosure, if the adaptation_mode field value is 00, it indicates adaptation mode 1, if the adaptation_mode field value is 01, it indicates adaptation mode 2, and if the adaptation_mode field value is 10, it indicates adaptation mode 3. Each adaptation mode has been described as above.

The context_config field may be a 2-bit field indicating combination of context information. If the context information does not exist in the corresponding table, the corresponding field may be set to '0x0'. If static_chain_byte ( ) or dynamic_chain_byte ( ) is included in the corresponding table, the corresponding field may be set to '0x01' or '0x02'. If both static_chain_byte ( ) and dynamic_chain_byte ( ) are included in the corresponding table, the corresponding field may be set to '0x03'.

The num_context field indicates the number of contexts of this table. A value of the num_context field cannot be greater than that of the max_CID field.

The context_length field may be an 8-bit field indicating a length of static_chain_byte ( ) sequence, dynamic_chain_byte ( ) sequence or a sequence obtained by adding static_chain_byte ( ) and dynamic_chain_byte ( ). The corresponding field may be omitted.

The static_chain_byte ( ) field may be a field for delivering static information used to initialize the RoHC-U decompressor. A size and structure of the corresponding field depend on the context profile.

The dynamic_chain_byte ( ) field may be a field for delivering dynamic information used to initialize the RoHC-U decompressor. A size and structure of the corresponding field depend on the context profile.

The static_chain_byte ( ) may be defined as subheader information of IR packets. The dynamic_chain_byte ( ) may be defined as subheader information of IR packets and IR-DYN packets.

As described above, the ALP streams including the APL packets generated in the link layer are transmitted to the physical layer.

Figure 15:
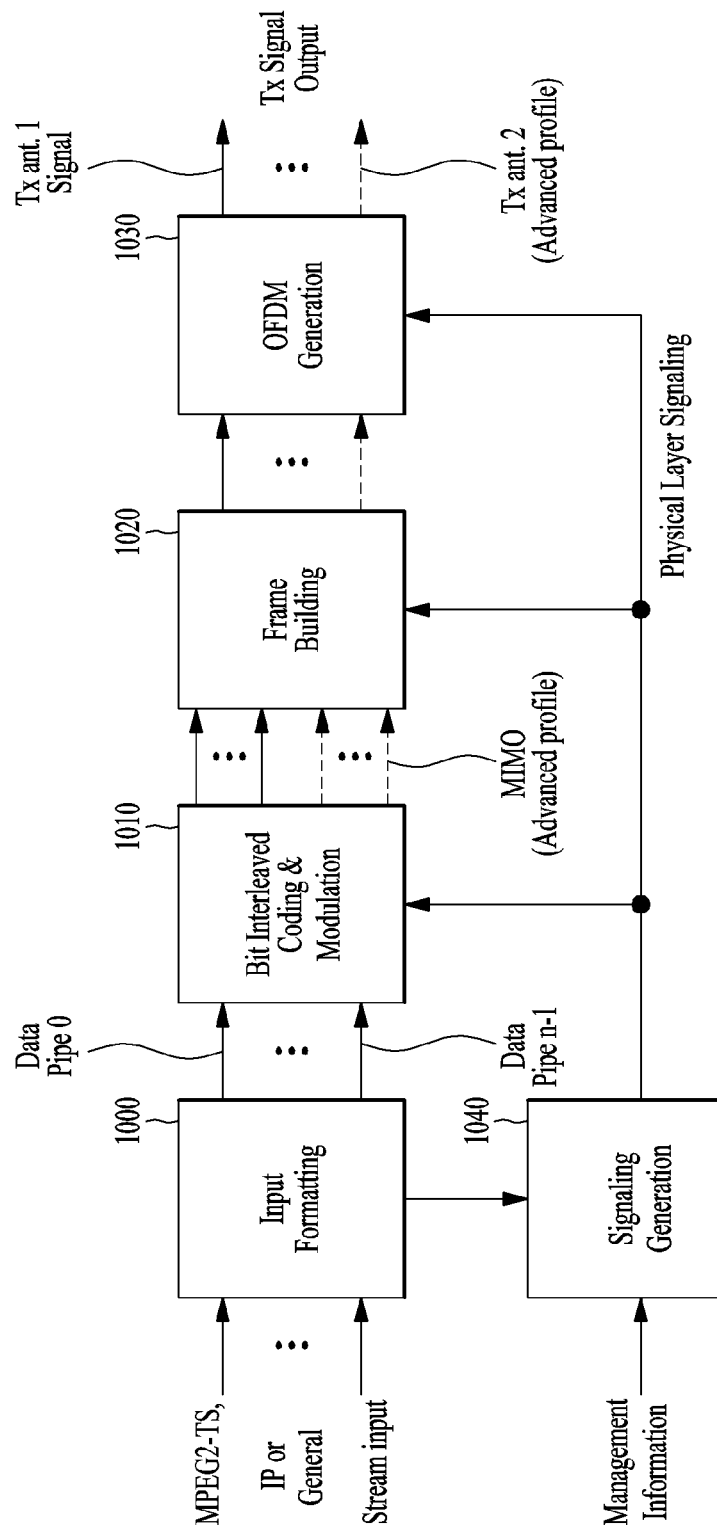
FIG. 15 is a block diagram illustrating one embodiment of a broadcast transmission device according to the present disclosure.

FIG. 15 is a diagram showing a structure of a broadcast signal transmission device of a broadcast service in a physical layer according to an embodiment of the present disclosure.

The broadcast signal transmission device of the broadcast service according to an embodiment of the present disclosure may include an input formatting block 1000, a bit interleaved coding & modulation (BICM) block 1010, a frame building block 1020, an orthogonal frequency division multiplexing (OFDM) generation block 1030, and a signaling generation block 1040. An operation of each block of the broadcast signal transmission device will be described.

According to an embodiment of the present disclosure, input data may be an IP stream/packets and MPEG2-TS or an ALP stream and other stream types may be handled as a general stream.

The input formatting block 1000 may demultiplex each input stream using one or more data pipes (i.e., physical layer pipe) to which independent coding and modulation are applied. The data pipe may be a basic unit for robustness control and may affect quality of service (QoS). One or more services or service components may affect one data pipe. The data pipe may be a logical channel in a physical layer for delivering service data or metadata for delivering one or more services or service components. In the present disclosure, the data pipe DP is a physical path used as the same meaning as the physical layer pipe (PLP), and its title may be changed depending on intention of a designer.

Figure 16:
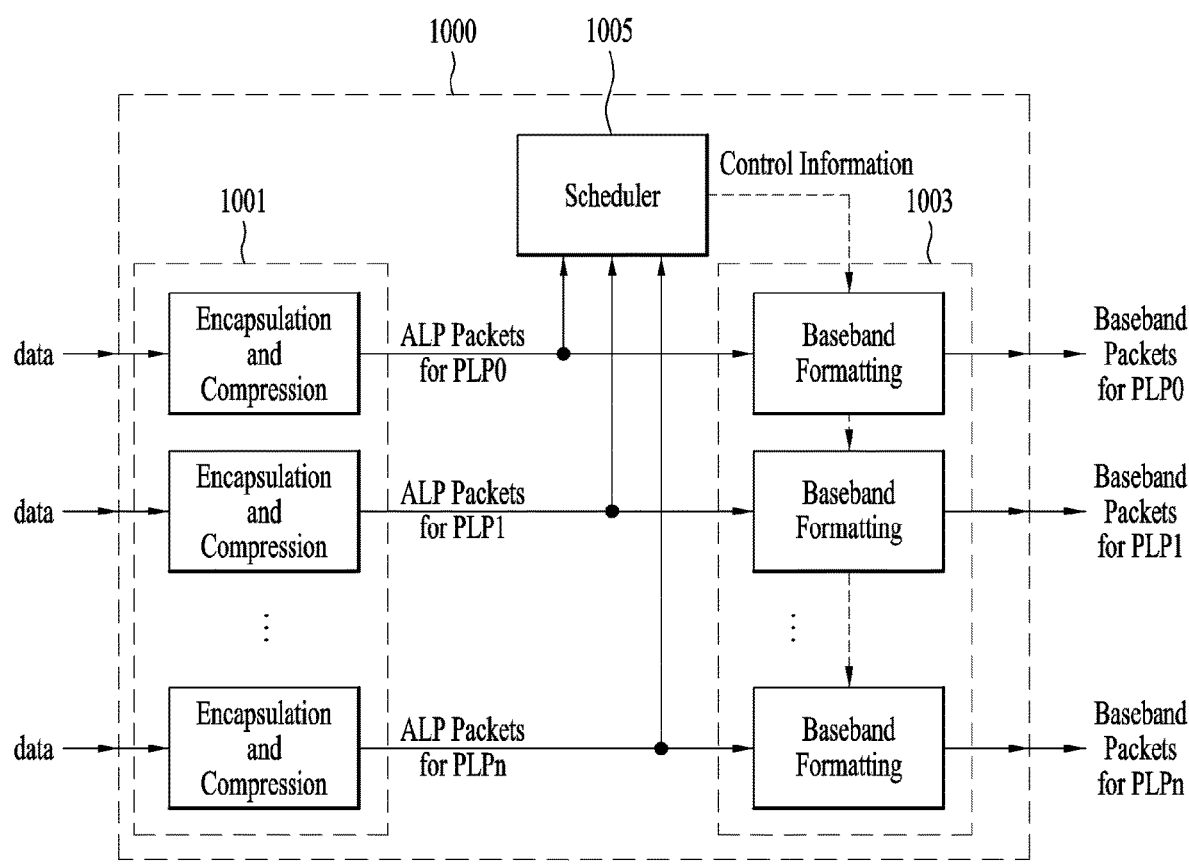
FIG. 16 is a detailed block diagram illustrating one embodiment of an input formatting block of FIG. 15.

FIG. 16 is a block diagram illustrating one embodiment of an input formatting block 1000 according to one embodiment of the present disclosure.

In FIG. 16, an input formatting block 1000 includes an encapsulation and compression block 1001, a baseband formatting block 1003, and a scheduler 1005.

The encapsulation and compression block 1001 performs header compression (selective) of input data packets and encapsulates the input data packets and then outputs them as the ALP packets. The detailed operation of the encapsulation and compression block 1001 has been described in the link layer and thus will be omitted herein. The encapsulation and compression block 1001 may be provided in the link layer or the physical layer. In one embodiment, if the encapsulation and compression block 1001 is provided in the link layer, the encapsulation and compression block 1001 will be omitted in the physical layer, and the baseband formatting block 1003 receives ALP streams of the ALP packets provided from the link layer.

A length of the ALP packets output from the link layer or the encapsulation and compression block 1001 is variable, and may be identified from the header of the ALP packets.

The ALP packets output from the encapsulation and compression block 1001 are input to the baseband formatting block 1003.

The baseband formatting block 1003 generates one or more data pipes in accordance with indication of the scheduler 1005. That is, the baseband formatting block 1003 generates baseband packets by adding a baseband header to a baseband payload including at least one ALP packet per data pipe and then outputs the baseband packets to the corresponding BICM block 1010 through the corresponding data pipe. Each data pipe includes streams of the baseband packets.

One baseband packet includes a baseband header and a baseband payload including at least one ALP packet. In one embodiment, a length of the baseband packets is fixed, and is determined by an outer code type selected for a target data pipe, an inner code rate, and a code length. In one embodiment, the ALP packets are allocated to the baseband payload in an input order. At this time, in one embodiment, if the number of the input ALP packets is not enough to fill the corresponding baseband packets, padding is used to fill the corresponding baseband packets. In one embodiment, if the number of the input ALP packets remains even after the corresponding baseband packets are filled with the last ALP packet, the remaining portion (that is, split ALPs) is allocated to next baseband packets.

The baseband header includes maximum three fields. The first portion is a base field indicating all baseband packets, the second portion is an optional field, and the third portion is an extension field.

Since QoS is dependent upon the characteristics of a service provided by the broadcast signal transmission device of the broadcast service according to an embodiment of the present disclosure, data corresponding to each service needs to be processed via different methods. The BICM block 1010 operates per data pipe.

The BICM block 1010 may include a processing block applied to a profile (or system) to which MIMO is not applied and/or a processing block of a profile (or system) to which MIMO is applied and may include a plurality of processing blocks for processing each data pipe.

The processing block of the BICM block 1010 to which MIMO is not applied may include a data FEC encoder, a bit interleaver, and a constellation mapper. The BICM block 1010 may further include a signal space diversity (SSD) encoding block and a time interleaver. The time interleaver may be included in the frame building block 1020. According to an embodiment of the present disclosure, the time interleaver is included in the frame building block 1020. The processing block of the BICM block 1010 to which MIMO is applied is different from the processing block of the BICM to which MIMO is not applied in that a cell word demultiplexer and an MIMO encoding block are further included. The MIMO encoding block may be formed independently without being included in the BICM block 1010.

The data FEC encoder may perform FEC encoding on an input baseband packet (BBP) using external coding (BCH) and internal coding (LDPC). The output of the data FEC encoder is an FEC frame. The external coding (BCH) may be a selective coding method. The bit interleaver may bit interleave output of the data FEC encoder to achieve optimized performance using a combination of the LDPC code and a modulation method. The constellation mapper may modulate cell word from a bit interleaver or a cell word demultiplexer using QPSK, QAM-16, irregular QAM (NUQ-64, NUQ-256, NUQ-1024), or irregular constellation (NUC-16, NUC-64, NUC-256, NUC-1024) and provide a power-normalized constellation point. NUC has an arbitrary type but QAM-16 and NUQ have a square shape. All of the NUQ and the NUC may be particularly defined with respect to each code rate and signaled by an L1D_PLP_mod field of L1 detail signaling data (or parameter DP_MOD of PLS2 data).

The time interleaver may be operated at a data pipe level. A parameter of the time interleaving may be differently set with respect to each data pipe. The output of the constellation matter is an FEC block.

In one embodiment, in the time interleaver of the present disclosure, one of no time interleaving mode, a convolutional time interleaver (CTI) mode and a hybrid time interleaver (HTI) mode is applied to each PLP. The time interleaver mode is signaled by an L1D_plp_TI_mode field of L1-Detail signaling data. As an example, if one service includes a plurality of components and each component is transmitted through each PLP, each PLP may be operated in the no time interleaving mode or the HTI mode. At this time, respective parameters of the HTI mode may be different from each other. As another example, if one service is transmitted through one PLP, the CTI mode may be used.

In case of the CTI mode, in one embodiment, the time interleaver includes a convolutional time interleaver. In one embodiment, signaling information related to the convolutional time interleaver is signaled to L1D_plp_CTI_depth field, L1D_plp_CTI_start_row field, and L1D_plp_CTI_fecframe_start field of the L1-Detail signaling data.

In case of the HTI mode, the time interleaver may include a cell interleaver, a block interleaver (BI), and a convolutional delay line (or convolutional interleaver). At this time, the block interleaver may be referred to as a twisted block interleaver.

The cell interleaver arranges input FEC blocks in a time interleaving (TI) block and then performs interleaving in each FEC block. That is, the cell interleaver receives input cells in a unit of the FEC blocks and arranges the input cells in TI blocks. At this time, each TI block may include one or more FEC blocks, and cell interleaving is performed per FEC block in the TI block by using different interleaving sequences. Also, cell interleaving may not be used, and information as to whether cell interleaving is used is signaled to L1D_plp_HTI_cell_interleaver field of the L1-Detail signaling data.

The block interleaver performs block interleaving for the TI blocks. For example, the block interleaver performs intra-subframe interleaving by performing twisted block interleaving for the TI blocks. At this time, one TI block may include one or more cell interleaved FEC blocks, or may include one or more FEC blocks which are not cell interleaved. After the twisted block interleaving is performed, the convolutional delay line is selectively performed. Whether the convolutional delay line is used is signaled to the L1D_plp_HTI_inter_subframe field of the L1-Detail signaling data.

In the present disclosure, the FEC blocks input to the time interleaver may be grouped into interleaving frames (IF). The interleaving frames has a structure independent from the physical layer frames. At this time, the number $N_{BLOCK\_IF}$ (n) of FEC blocks in the IF may be changed from minimum 1 to maximum $N_{BLOCK\_if\_MAX}$, and the number of FEC blocks may be different between the IFs. Information related to the number of FEC blocks in the IFs is signaled to the L1D_plp_HTI_num_ti_block field of the L1-Detail signaling data.

At this time, each IF may directly be mapped into one subframe, or may be spread into multiple subframes. Each IF may be divided into one or more TI blocks, and at this time, the TI block is a basic unit for the operation of the cell interleaver, the block interleaver, and the convolutional delay line. Each TI block in one IF block may include one or more FEC blocks.

The cell word demultiplexer is used to split a single cell word stream into double cell word streams to process MIMO. In one embodiment, the cell word demultiplexer is located between the bit interleaver and the constellation mapper, and the MIMO encoding block is located between the constellation mapper and the time interleaver. Since the single cell word stream is split into the double cell word streams by the cell word demultiplexer if MIMO is applied, two constellation mappers are required. The MIMO encoding block may process the output of each constellation mapper by using a MIMO encoding scheme. The MIMO encoding scheme of the present disclosure may be defined as full-rate spatial multiplexing (FR-SM) for providing capacity increase by relatively small complexity increase in the receiver. MIMO processing is applied at a data pipe level. If NUQ ($e_{1,i}$, and $e_{2,i}$) which are a pair of the constellation mapper output are supplied as the input of the MIMO encoding block, the output pair g1,i and g2,I of the MIMO encoding block are transmitted by the same carrier k and OFDM symbol l of each transmitting antenna. In one embodiment of the present disclosure, MIMO processing is not applied to a bootstrap and a preamble within a frame.

The frame building block 1020 may map data cells of a PLP input by being time interleaved, into OFDM symbols in the frame and perform frequency interleaving for frequency domain diversity.

In one embodiment, the outputs of the frame building block 1020 are OFDM symbols, such as preamble or data, which are sequentially arranged in a final frame, and frequency interleaving in the frequency interleaver is performed for the OFDM symbols. That is, the frequency interleaver may provide frequency diversity by randomly interleaving the input data cells. Also, the frequency interleaver may operate for data corresponding to an OFDM symbol pair comprised of two sequential OFDM symbols or data corresponding to one OFDM symbol by using a different interleaving seed order to obtain maximum interleaving gain in a single frame.

The frame output by being subjected to frequency interleaving is divided into a preamble region and a data region. In the OFDM generation block 1030, a bootstrap region including bootstrap data is inserted in front of the preamble of the frame. In one embodiment, L1 signaling data transmitted through the preamble are generated in the signaling generation block 1040.

The L1 signaling data include L1-Basic signaling data and L1-Detail signaling data. The L1-Basic signaling data may be referred to as PLS1 data, and the L1-Detail signaling data may be referred to as PLS2 data.

The OFDM generation block 1030 modulates OFDM carriers by a cell generated by the frame building block 1020, inserts pilots, and generates a time domain signal for transmission. Also, the corresponding block sequentially inserts guard intervals, applies PAPR reduction processing and then generates a final RF signal by inserting a bootstrap including bootstrap data into the front of the corresponding frame.

The signaling generation block 1040 may generate physical layer signaling information used for an operation of each functional block. Physical layer signaling information according to one embodiment of the present disclosure may include L1-Basic signaling data and L1-Detail signaling data. In one embodiment, the L1-Basic signaling data (or PLS1 data) delivers basic information on the system as well as parameters required for decoding of the L1-Detail signaling data (or PLS2 data). In one embodiment, a length of the L1-Basic signaling data is fixed to 200 bits. The L1-Detail signaling data (or PLS2 data) define data context and information required for decoding of data context in detail.

The BICM block 1010 may further include a BICM block for protection of the L1 signaling data (or PLS data). The BICM block for protection of the L1 signaling data (or PLS data) may include an FEC encoder, a bit interleaver and a constellation mapper.

The FEC encoder may include a scrambler for respectively scrambling L1-Basic signaling data (or PLS1 data) and L1-Detail signaling data (or PLS2 data), a BCH encoding/zero insertion block for performing outer encoding (e.g., BCH) for the scrambled L1-Basic and detail signaling data (or PLS 1 and 2 data) and inserting zero bit after BCH encoding, an LDPC encoding block for performing encoding by using LDPC code, and an LDPC parity puncturing block. The output bits of the zero-inserted L1-Basic signaling data and/or L1-Detail signaling data may be subjected to permutation after LDPC encoding. The bit interleaver may perform bit interleaving for the L1-Basic signaling data and L1-Detail signaling data, which are subjected to shortening and puncturing, and the constellation mapper may map the bit interleaved L1-Basic signaling data and L1-Detail signaling data into constellation. In one embodiment, time interleaving is not performed for the L1 signaling data but frequency interleaving is performed for the L1 signaling data.

Figure 17:
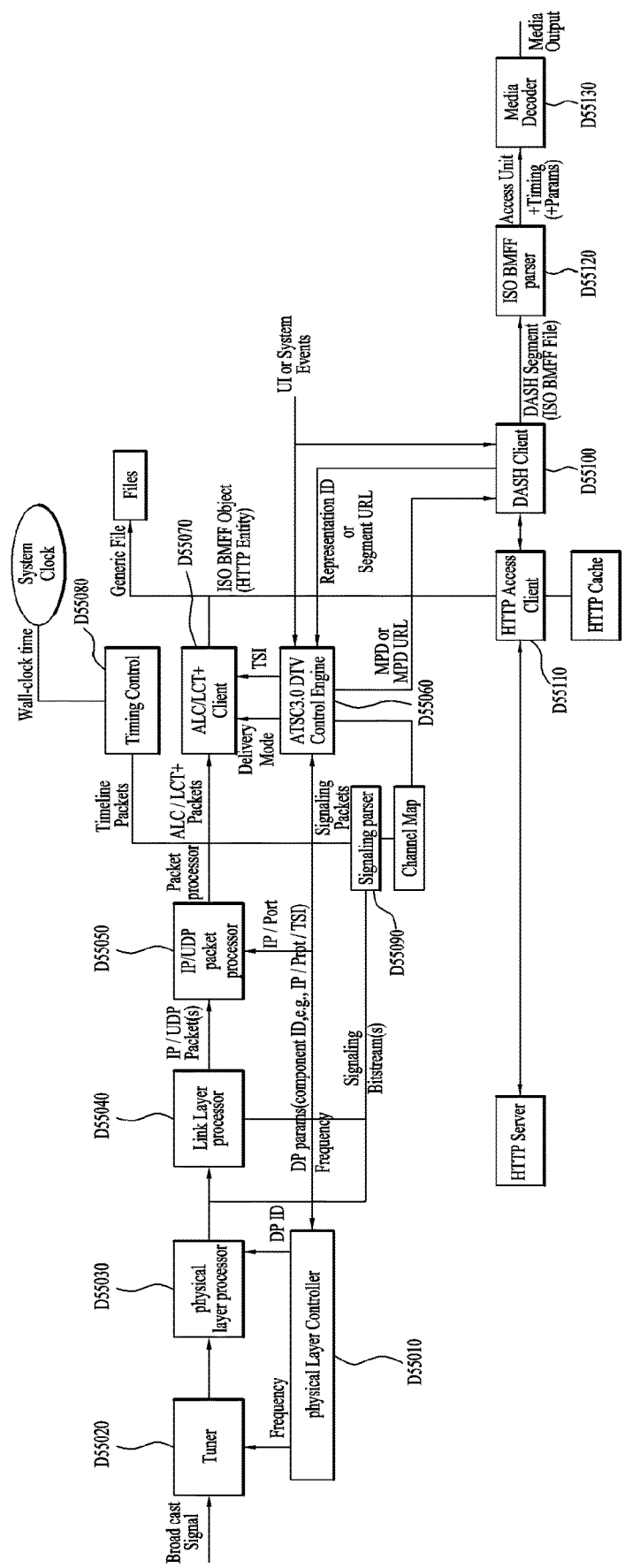
FIG. 17 is a block diagram illustrating one embodiment of a hybrid broadcast signal reception device according to the present disclosure.

FIG. 17 is a block diagram illustrating one embodiment of a hybrid broadcast signal reception device according to the present disclosure.

The hybrid broadcast receiver may receive a hybrid broadcast service through interaction between terrestrial broadcasting and a broadband from a DTV service of a broadcast system. The hybrid broadcast receiver may receive broadcast Audio/Video (A/V) contents transmitted through terrestrial broadcasting, and may receive enhancement data associated with the A/V contents or some of the A/V contents. In this specification, the broadcast A/V contents may be referred to as media contents.

The hybrid broadcast receiver may include a Physical Layer Controller D55010, a tuner D55020, a Physical Layer Processor D55030, a Link Layer Processor D55040, an IP/UDP packet processor D55050, an ATSC 3.0 DTV Control Engine D55060, an ALC/LCT+Client D55070, a Timing Control D55080, a Signaling Parser D55090, a Dynamic Adaptive Streaming over HTTP (DASH) Client D55100, an HTTP Access Client D55110, an ISO Base Media File Format (BMFF) Parser, (ISO BMFF Parser) D55120, and/or a Media Decoder D55130.

The physical layer controller D55010 may control the operation of the tuner D55020, the physical layer processor D55030, etc. by using Radio Frequency (RF) information of a terrestrial broadcast channel desired to be received by the hybrid broadcast receiver.

The tuner D55020 receives and processes a broadcast signal, which is transmitted through a broadcast network, through m number of antennas, and outputs the broadcast signal to the physical layer processor D55030.

In one embodiment, the physical layer processor D55030 performs demodulation, frame parsing, deinterleaving, and error correction decoding for the broadcast signal output from the tuner D55020.

Figure 18:
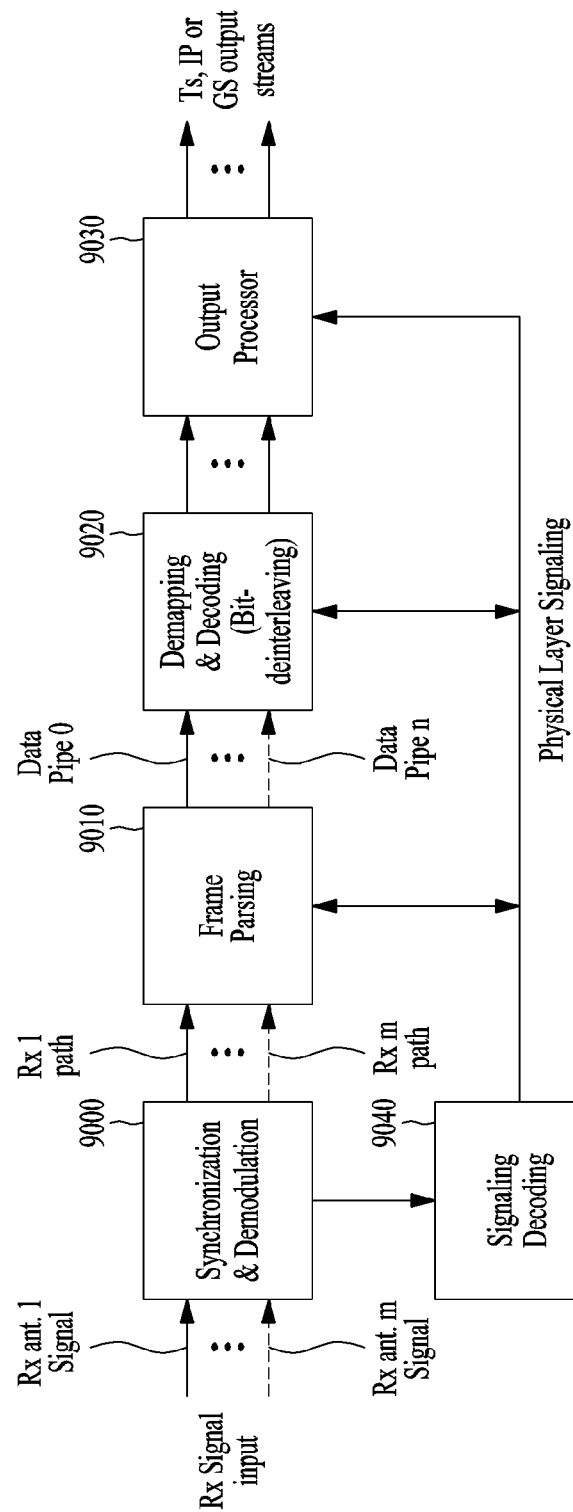
FIG. 18 is a block diagram illustrating one embodiment of a broadcast signal reception device of a physical layer according to the present disclosure.

FIG. 18 is a block diagram illustrating one embodiment of the physical layer processor D55030. That is, FIG. 18 illustrates a structure of a broadcast signal reception device for a broadcast service in a physical layer according to one embodiment of the present disclosure.

The broadcast signal reception device for a broadcast service according to one embodiment of the present disclosure may correspond to the broadcast signal transmission device for a broadcast service of FIG. 15.

The broadcast signal reception device for a broadcast service according to one embodiment of the present disclosure may include a synchronization & demodulation module 9000, a frame parsing module 9010, a demapping & decoding module 9020, an output processor 9030, and a signaling decoding module 9040.

In one embodiment, the synchronization & demodulation module 9000 performs synchronization for the broadcast signal received and processed by the tuner D55020 and performs OFDM demodulation in a reverse procedure of the broadcast signal transmission device. That is, the synchronization and demodulation module 9000 may perform bootstrap information detection, Fast Fourier Transform (FFT), and pilot detection.

The frame parsing module 9010 may include a frequency deinterleaver, a frame parser, and a time deinterleaver. In the broadcast signal transmission device of the present disclosure, frequency interleaving is essential for preamble symbols of the demodulated broadcast signal, and is optional for data symbols included in subframe(s) of the demodulated broadcast signal. Therefore, the frequency deinterleaver performs frequency deinterleaving for the preamble symbols, and selectively performs frequency deinterleaving for the data symbols in accordance with L1D_frequency_interleaver field of the L1-Detail signaling data. The frequency deinterleaved preamble symbols are output to the signaling decoding module 9040, and the signal frame including the data symbols of the subframe(s) for which frequency deinterleaving is selectively performed is output to the frame parser and then parsed in the frame parser. The data pipes (that is, PLPs) included in the subframe(s) parsed by the frame parser are output to the time deinterleaver per data pipe and time deinterleaved in a reverse procedure of the broadcast signal transmission device. The frame parsing and time deinterleaving are performed based on the L1 signaling data.

The signaling decoding module 9040 decodes the L1 signaling data included in the preamble and provides information include in the L1 signaling data to necessary blocks. To this end, the signaling decoding module 9040 includes a constellation demapper, a bit deinterleaver, and an FEC decoder, and performs decoding for the L1 signaling data in a reverse procedure of the broadcast signal transmission device.

The demapping and decoding module 9020 performs symbol demapping for data of the corresponding data pipe in a reverse procedure of the broadcast signal transmission device based on the L1 signaling data, perform bit deinterleaving and then performs error correction decoding. The output of the demapping and decoding module 9020 is at least one baseband packet.

The output processor 9030 may perform reverse procedures of various compression/signal processing procedures applied by the broadcast signal transmission device for input baseband packets to improve transmission efficiency. In this case, the output processor 9030 may acquire necessary control information from the data output from the signaling decoding module 9040.

Decapsulation, adaptation, and decompression processing for the ALP packets included in the payload of the baseband packet may be performed by the physical layer, or may be performed by the link layer. If decapsulation, adaptation, and decompression processing for the ALP packets are performed by the physical layer, a decapsulation module, an adaptation module, and a decompression module may be included in the output processor 9030. In this case, in one embodiment, the output processor 9030 detects the ALP packets by processing the baseband packets in the reverse procedure of the broadcast signal transmission device and performs decapsulation, adaptation, and decompression processing for the detected ALP packets. At this time, the outputs of the output processor 9030 may be IP streams/packets or MPEG2-TS. If decapsulation, adaptation, and decompression processing for the ALP packets are performed by the link layer, the outputs of the output processor 9030 may be ALP streams that include the ALP packets.

In one embodiment of the present disclosure, decapsulation, adaptation, and decompression processing are performed by the link layer.

In this case, the physical layer processor D55030 of FIG. 17 outputs the streams of the ALP packets to the link layer processor D55040.

The link layer processor D55040 performs decapsulation, adaptation, and decompression processing for the input ALP packets, and a detailed operation will be described later.

If the input packets included in the ALP packets are IP packets, the outputs of the link layer processor D55040 become one or more IP packets. In the present disclosure, IP packets are used to refer to the same meaning as IP datagrams.

The IP/UDP packet processor D55050 may filter a specific one of one or more received IP packets. That is, the IP/UDP packet processor D55050 filters IP packet selected by the DTV control engine D55060 from one or more IP packets output from the link layer processor D55040, and outputs the IP packet in the form of application layer transport protocol packet such as ALC/LCT+.

The DTV control engine D55060 may be in charge of interface between modules included in each hybrid broadcast receiver. Also, the DTV control engine D55060 may deliver parameters required for each module to each module and control an operation of each module through the parameters. In the present disclosure, the DTV control engine D55060 may deliver Media Presentation Description (MPD) and/or MPD URL to the DASH client D55100. Also, in the present disclosure, the DTV control engine D55060 may deliver a delivery mode and/or a Transport Session Identifier (TSI) to the ALC/LCT+ client D55070. In this case, the TSI may indicate an identifier of a session for transmitting a transport packet including signaling message such as MPD or MPD URL related signaling, for example, ALC/LCT+ session or FLUTE session which is the application layer transport protocol. Also, the transport session identifier may correspond to Asset id of MMT.

The ALC/LCT+ client D55070 may generate one or more ISO Base Media File Format (ISOBMFF) objects by processing the application layer transport protocol such as ALC/LCT+ and collecting and processing a plurality of packets. ALC/LCT packet, ALC/LCT+ packet, ROUTE packet, and/or MMTP packet may be included in the application layer transport protocol packet.

The timing controller D55080 may process packets including system time information and therefore control a system clock.

The signaling parser D55090 may acquire and parse DTV broadcast service related signaling (e.g., LLS, SLS) and generate and manage a channel map based on the parsed signaling. In the present disclosure, the signaling parser may parse MPD or MPD related information extended from the signaling information.

The DASH client D55100 may perform computation related to Real-time Streaming or Adaptive Streaming. The DASH client D55100 may receive DASH contents from the HTTP server through the HTTP access client D55110. The DASH client D55100 may output ISO Base Media File Format objects by processing the received DASH segments. In the present disclosure, the DASH client D55100 may deliver fully qualified representation ID or segment URL to the DTV control engine D55060. In this case, the fully qualified representation ID, for example, may mean ID obtained by combination of MPD URL, period@id and representation@id. Also, the DASH client D55100 may receive MPD or MPD URL from the DTV control engine D55060. The DASH client D55010 may receive a desired media stream or DASH segment from the HTTP server by using the received MPD or MPD URL. In this specification, the DASH client D55100 may be referred to as a processor.

The HTTP access client D55110 may request specific information for the HTTP service, and may process a response to the request by receiving the response from the HTTP server. In this case, the HTTP server may process the request received from the HTTP access client and provide a response to the request.

The ISO BMFF parser D55120 may extract data of audio/video from the ISO Base Media File Format objects.

The media decoder D55130 may decode the received audio and/or video data and perform processing for presentation of the decoded audio/video data.

Meanwhile, as described above, the data processed in accordance with MMTP or ROUTE protocol in the delivery layer of the transmission system are capsulated into the IP packets in the UDP/IP layer and then transmitted to the link layer. That is, in one embodiment, the UDP adder is added to a UDP payload including the data processed in accordance with the MMTP or ROUTE protocol to generate IP/UDP packets. In the present disclosure, for convenience of description, packets comprised of an IP header, a UDP header and a payload or packets comprised of an IP header and a payload will be referred to as IP packets.

Figure 19:
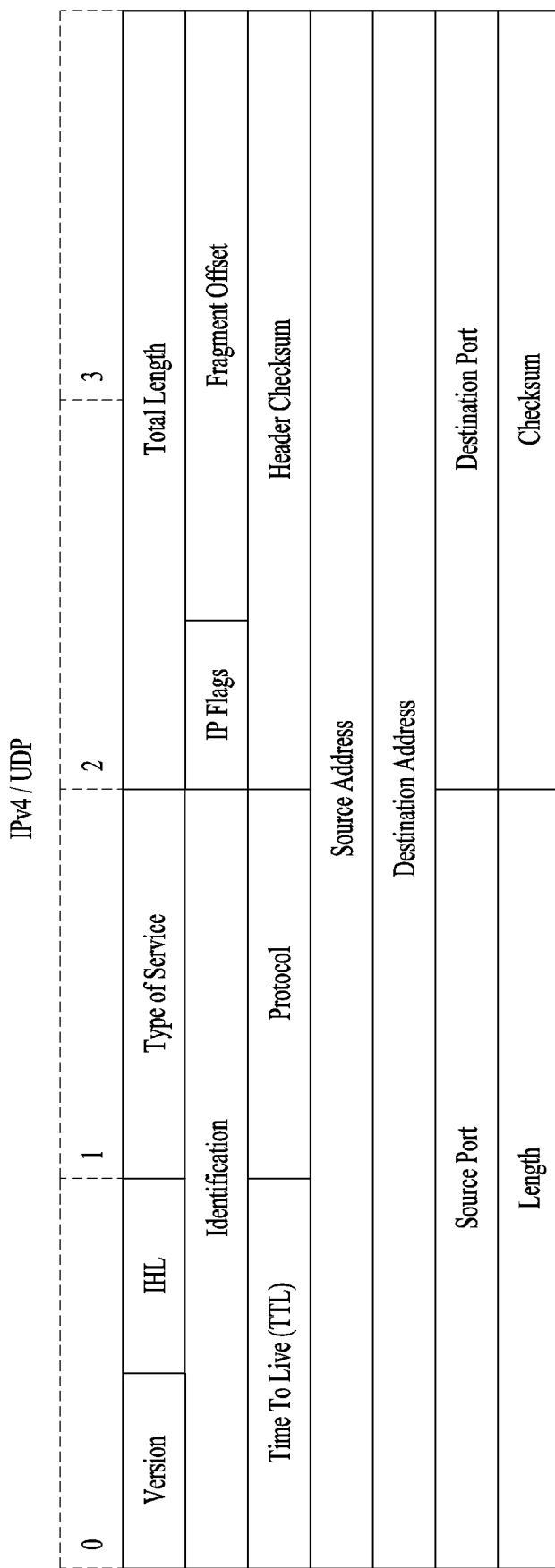
FIG. 19 is a diagram illustrating one embodiment of an IP header structure of an IP packet according to the present disclosure.
Figure 20:
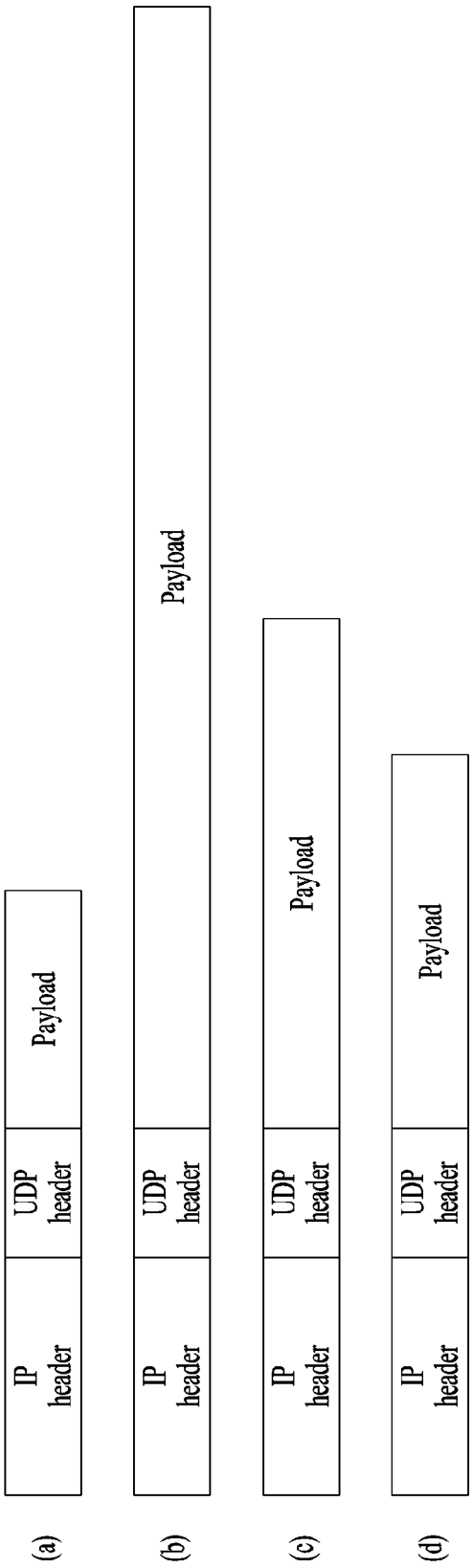
FIGS. 20(a) to 20(d) are diagrams illustrating one embodiment of IP packets generated in IP/UDP layer according to the present disclosure.
Figure 21:
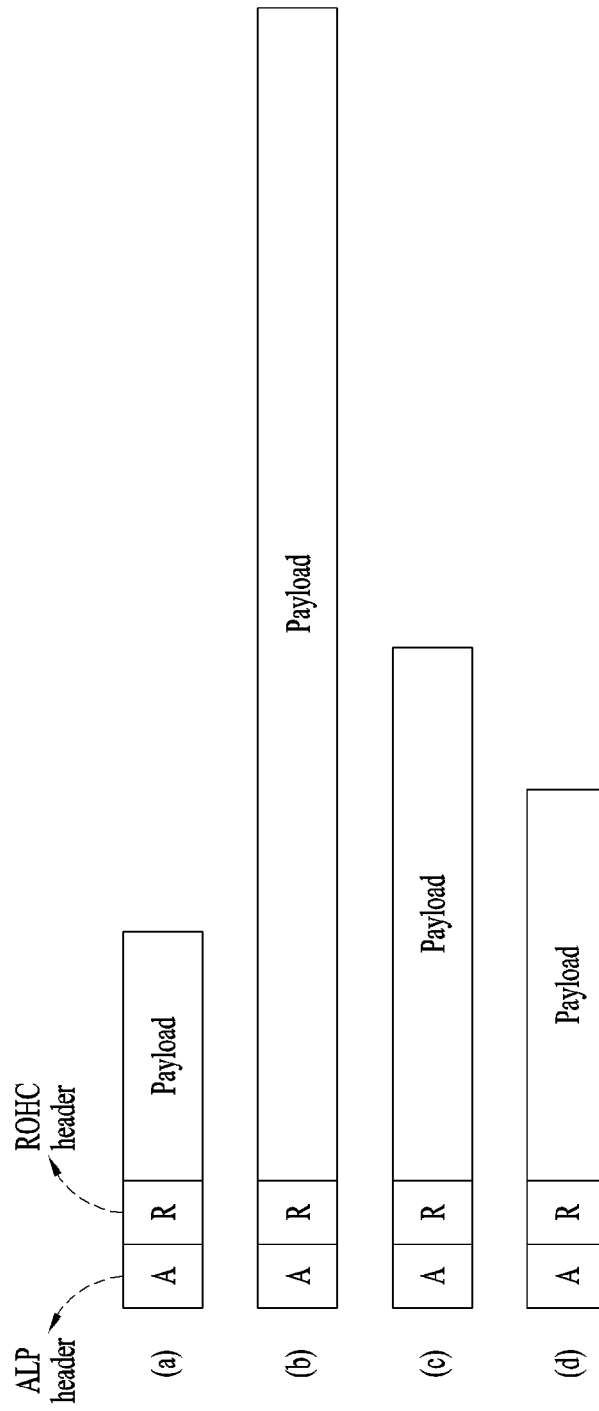
FIGS. 21(a) to 21(d) are diagrams illustrating one embodiment of header compression and link layer packet encapsulation applied to IP packets of FIGS. 20(a) to 20(d)

FIG. 19 is a diagram illustrating one embodiment of a header structure of IP packets transmitted to a link layer, wherein the header includes an IP header and a UDP header.

In FIG. 19, 4 bits are allocated to a version field, which indicates that a version of the corresponding packets is IPv4 or IPv6. In one embodiment, the version is IPv4.

An Internet Header Length (IHL) field is allocated with 4 bits, and indicates a length of the IP header. That is, the IHL field indicates a length of a pure header except the length of the data region.

A Type of Service (TOS) field is allocated with 8 bits, and displays contents related to quality of service (QoS) provided by an IP protocol to a user. That is, the TOS field defines a priority of the IP packets.

The total length field is allocated with 16 bits, and indicates a sum size of the IP header and the actual data region in a byte unit. That is, the total length field indicates a total length of the corresponding IP packet.

An identification field is allocated with 16 bits, and is an identifier for identifying each IP packet. If the IP packets to be transmitted are subjected to fragmentation into two or more small packets, identification field values of the packets fragmented from one IP packet are equal to one another. That is, the IP packets which are not subjected to fragmentation have different values. In the present disclosure, for convenience of description, the packets fragmented from one IP packet will be referred to as fragment packets or fragmented IP packets.

An IP flags field is allocated with 3 bits, and includes information related to fragmentation of the IP packets. A first flag of this field is 0, a second flag is a Don't fragment (DF), and indicates that the corresponding packet has been fragmented. For example, if the DF has a flag value of 0, it indicates that the corresponding packets are fragmented packets. If the DF has a flag value of 1, it indicates that the corresponding packets are packets which are not fragmented. A third flag of this field is a More Fragment (MF) flag, and indicates that the corresponding packet is the last fragment packet. For example, if the MF flag has a value of 0, it indicates that the corresponding packet is the last fragment packet, and if the MF flag has a value of 1, it indicates that the corresponding packet is not the last fragment packet.

A fragment offset field is allocated with 13 bits, and indicates a relative position of the corresponding fragment packet in the data region in the IP packets when the IP packets are fragmented.

A time to live (TTL) field is allocated with 8 bits, and indicates how long the corresponding packet may remain on the network.

A Protocol field is allocated with 8 bits, and indicates a upper layer protocol stored in the payload of the corresponding IP packet.

A header checksum field is allocated with 16 bits, and is used for only the IP header.

A Source IP address field and a Destination IP address field are allocated with 32 bits, respectively, and indicate a source IP address and a destination IP address of the corresponding packet.

The version field, the IHL field, the TOS field, the total length field, the Identification field, the IP flags field, the Fragment offset field, the TTL field, the Protocol field, and the Header Checksum field are fields included in the IP header.

In FIG. 19, the source port field, the destination port field, the Length field, and the Checksum field are fields included in the UDP header.

The source port field and the destination field are allocated with 16 bits, respectively, and indicate a source port number and a destination port number of the corresponding packet.

The length field is allocated with 16 bits, and indicates a sum size of the UDP header and the actual data region in a byte unit. That is, the length field indicates a total length of the corresponding UDP packet.

The checksum field is allocated with 16 bits, and is used for only the UDP header.

Next, a fragmentation procedure of the IP packets will be described.

When a size of an IP packet to be transmitted from the IP/UDP layer to the link layer is greater than a Maximum Transmission Unit (MTU), fragmentation is performed for the IP packet, whereby the IP packet is split into two or more fragmented packets and then transmitted. In this case, in one embodiment, the MTU means a size of data that may be transmitted from the IP/UDP layer to the link layer at one time. That is, if the size of the IP packet to be transmitted to the link layer is greater than the MTU, the IP packet cannot be transmitted, whereby fragmentation is performed for the IP packet.

If fragmentation is performed for the IP packet, the IP packet is split into two or more fragments and IP header is added to the front of each fragment to generate fragment packets. In other words, each fragment packet is an IP packet comprised of an IP header and a payload.

For example, it is assumed that fragmentation is performed for the IP packet in the IP/UDP layer and the IP packet is split into three fragment packets. It is also assumed that the first fragment packet is referred to as a fragment packet A, the second fragment packet is referred to as a fragment packet B, and the third fragment packet is referred to as a fragment packet C.

At this time, identification field values within the respective IP headers of the fragment packets A, B and C are all equal to one another but fragment offset field values are all different from one another. The DF flags of the IP Flags fields within the respective IP headers of the fragment packets A, B and C are all set to 0 to indicate that the corresponding packets are fragmented packets. In addition, the MF flags of the IP Flags fields within the respective IP headers of the fragment packets A and B are all set to 1 to indicate that there are additional fragment packets, and the MF flag within the IP header of the fragment packet C is set to 0 to indicate the last fragment packet.

FIGS. 20(a) to 20(d) are diagrams illustrating that four IP packets, for which fragment is not performed, are transmitted from the IP/UDP layer to the link layer. In this case, the identification field values within the respective IP headers of four IP packets are all different from one another, and fragment offset field values are all 0. The DF flags of the IP Flags fields within the respective IP headers of four IP packets are all set to 1 to indicate that the corresponding packets are the packets which are not fragmented. In addition, the MF flags of the IP Flags fields within the respective IP headers of four IP packets are all set to 0 in accordance with one embodiment.

FIGS. 21(a) to 21(d) are diagrams illustrating that RoHC scheme is applied to four IP packets to perform IP header compression and then the IP packets are encapsulated into the ALP packets when the four IP packets are received as shown in FIGS. 20(a) to 20(d). In this case, RoHC header is applied to each payload by header compression and the ALP header is added by encapsulation processing to generate four ALP packets.

Figure 22:
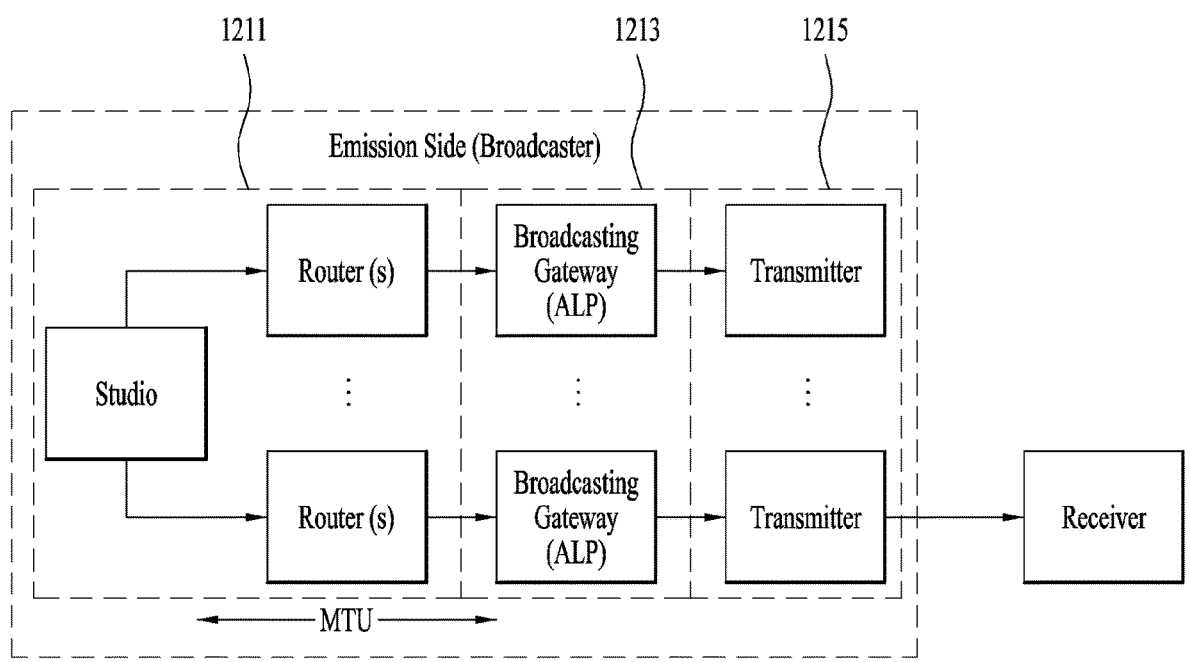
FIG. 22 is a block diagram illustrating one embodiment of a broadcast system according to the present disclosure.

FIG. 22 is a block diagram illustrating one embodiment of a broadcast system of a data transmission procedure according to the present disclosure.

In FIG. 22, the broadcast system may include a studio 1211, a broadcast gateway 1213, and a transmitter 1215. In the present disclosure, the broadcast gateway 1213 may be referred to as a link layer processor.

In one embodiment, the studio 1211 performs operations and a transmission function in the IP/UDP layer and layers more than the IP/UDP layer in consideration of an OSI 7 layer structure. In one embodiment, the broadcast gateway 1213 performs an operation and a transmission function in the link layer (that is, Layer 2). If packets transmitted from the studio 1211 are IP packets, the broadcast gateway 1213 includes a RoHC module, an adaptation module, and an encapsulation module as shown in FIG. 7. In one embodiment, the transmitter 1215 performs an operation and a transmission function in the physical layer. In one embodiment, the transmitter 1215 includes the broadcast signal transmission device of FIG. 15.

Functions or modules of each of the studio 1211, the broadcast gateway 1213 and the transmitter 1215 are connected to a link having a separate protocol, wherein the link is referred to as a Studio to Transmitter Link (STL) in one embodiment.

For example, based on ATSC 3.0, the studio 1211 encodes video and/or audio data, and configures a delivery format by using ROUTE and/or MMT packets including the encoded video and/or audio data. The studio 1211 processes the ROUTE packets and/or MMT packets in IP/UDP packets and delivers the packets to the broadcast gateway 1213. The broadcast gateway 1213 corresponds to an ATSC Link-layer Protocol (ALP) function in case of ATSC 3, and corresponds to a Generic Stream Encapsulation (GSE) function in case of DVB. Generally, the RoHC modules of the IP (or IP/UDP) layer and the link layer operate independently from each other.

Figure 23:
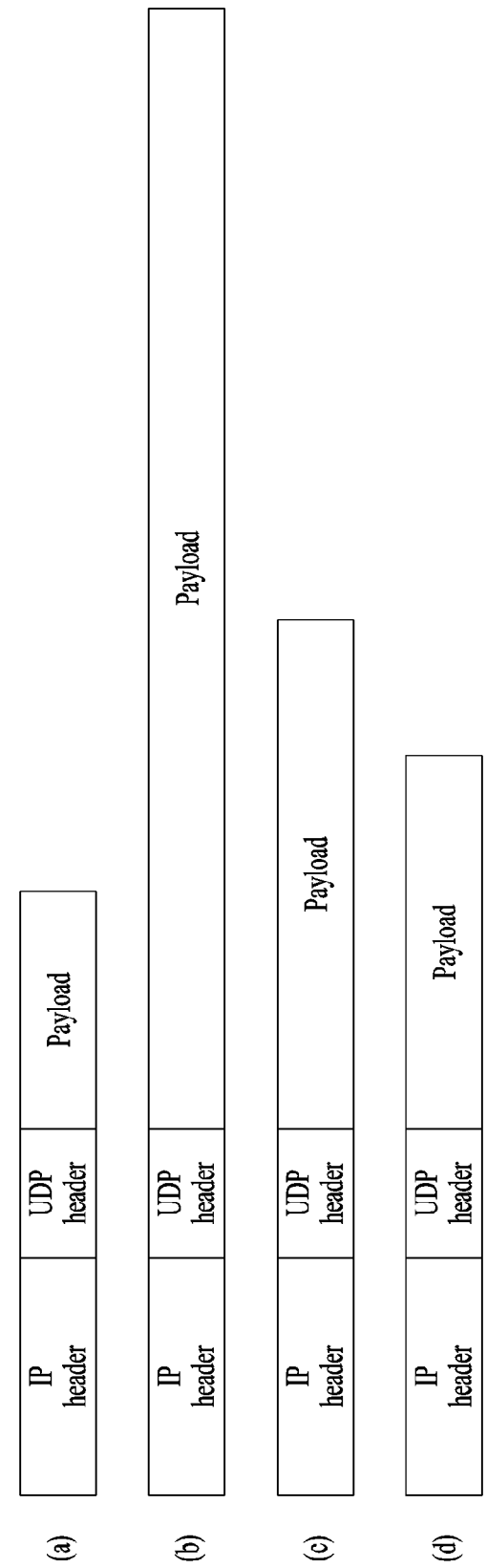
FIGS. 23(a) to 23(d) are diagrams illustrating one embodiment of IP packets generated in IP/UDP layer according to the present disclosure.
Figure 24:
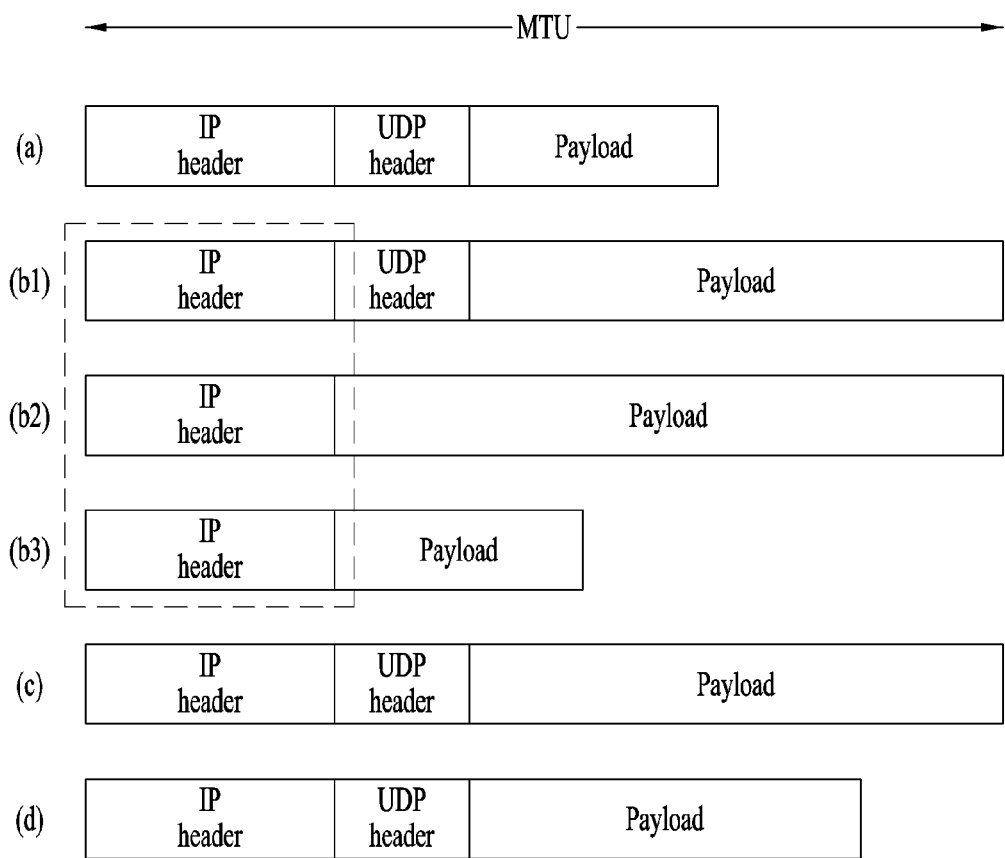

FIGS. 23(*a*) to 23(*d*) are diagrams illustrating one embodiment of four IP packets generated in IP/UDP layer according to the present disclosure, and FIGS. 24(*a*), 24(*b*1) to 24(*b*3), 24(*c*) and 24(*d*) are diagrams illustrating that fragmentation is performed for IP packets of FIG. 23(*b*) to generate three fragment packets like FIGS. 24(*b*1) to 24(*b*3). That is, the IP packets of FIGS. 24(*a*), 24(*b*1) to 24(*b*3), 24(*c*) and 24(*d*) are input to the RoHC module of the link layer.

When fragmentation is performed for the IP packets having the IP header and the UDP header, that is, IP/UDP packets, as shown in FIGS. 24(*b*1) to 24(*b*3), it is noted that the UDP header exists only in the first fragment packet and does not exist in the other fragment packets. The IP header exists in all the fragment packets.

IP fragmentation is supported when the IP packets are delivered to the link layer, IP packets of a sufficient length are not processed in a delivery path or router of the IP packets, that is, MTU is shorter than a length of IP packet to be transmitted by the MTU. In accordance with the MTU that may be transmitted by the delivery path or router of the IP packets, one IP packet is split into a plurality of fragments, and the IP header is added to each fragment to generate fragment packets and then the fragment packets are transmitted to the link layer. That is, in accordance with the MTU of the router or a link between studio-broadcast gateway, the IP packets may be fragmented in the studio and then transmitted to the broadcast gateway. In the receiver, fragment packets to which fragmentation is applied, that is, the IP packets may be restored to the original IP packets based on fragment related information signaled to each IP header.

As described above, in one embodiment, the RoHC scheme is used for header compression of the IP packets, and RoHC framework operates in a unidirectional mode (U-mode) in consideration of properties of ATSC 3.0 broadcast link. In the RoHC framework, a plurality of header compression profiles are defined. Each profile indicates a specific protocol combination, and profile identifiers are allocated by Internet Assigned Numbers Authority (IANA). In one embodiment, '0x0002' profile is used for ATSC 3.0. The following Table 1 is an example of RoHC profile defined for ATSC 3.0.

TABLE 1

| Profile Identifier | Profile | Protocol Combination | Reference |
| --- | --- | --- | --- |
| 0x0002 | RoHC UDP | UDP/IP | RFC 3095, RFC 4815 |

That is, in the RoHC module of the link layer does not perform header compression if there is no any one of the IP header and the UDP header in the RoHC module of the link layer. Therefore, as shown in FIGS. 24(*b*2) and 24(*b*3), header compression is not performed for IP packets having no UDP header.

In other words, the RoHC module applies an uncompressed profile having a profile number of 0x00 if IP packets having no UDP header are input by IP fragmentation as shown in FIGS. 24(*b*2) and 24(*b*3). At this time, since the uncompressed profile has a structure for transmitting the actual IP header by using the RoHC header format, header compression efficiency cannot be expected.

Figure 25:
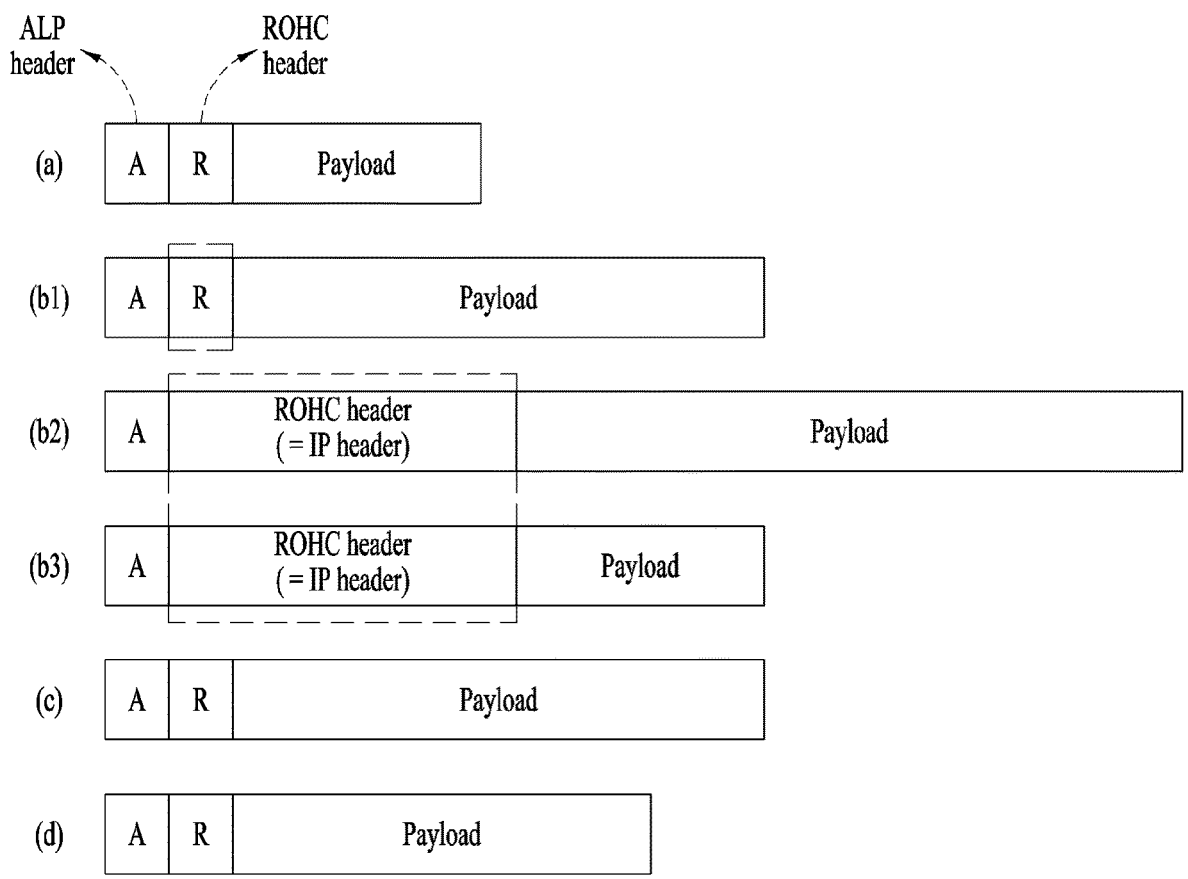

FIGS. 25(*a*), 25(*b*1) to 25(*b*3), 25(*c*) and 25(*d*) are diagrams illustrating ALP packets when the RoHC module of the broadcast gateway 1213 applies header compression and encapsulation to the IP packets of FIGS. 24(*a*), 24(*b*1) to 24(*b*3), 24(*c*) and 24(*d*).

As shown in FIGS. 25(*b*2) and 25(*b*3), it is noted that header compression has not been actually performed for IP packets having no UDP header and a format of the IP packets has been changed in the form of RoHC packet header. That is, IP packets having both the IP header and the UDP header are subjected to header compression in 0x02 profile, whereas IP packets (that is, fragment packets) having the IP header but no UDP header are subjected to header compression in 0x00 profile.

Some problems may occur if IP header compression is performed as shown in FIGS. 25(*a*), 25(*b*1) to 25(*b*3), 25(*c*) and 25(*d*). That is, if a compressed profile is changed in the middle of packet streams, a problem occurs in that system complexity and delay are increased. If packet streams of a single type are delivered, one profile and RoHC packet structure according to one profile may be used but additional profile for IP fragmentation should be configured and should correspond to additional RoHC packet structure according to additional profile. Also, delay occurs in the transmitter in the middle of switching the profile, and much memory capacity for synchronization between packet streams header compressed using different profiles is required for the receiver. In order to efficiently use a bandwidth by using RoHC and at the same time quickly transmit and receive mass broadcast streams, it is important to reduce overhead. In order to reduce overhead, it is the most effective to increase capacity for a broadcast transmission network. However, a problem occurs in that much cost and much time are required to update an infrastructure of the broadcast system.

In order to solve the above problems, the present disclosure suggests additional pre-processing for IP fragmentation in the link layer within the broadcast gateway.

Figure 26:
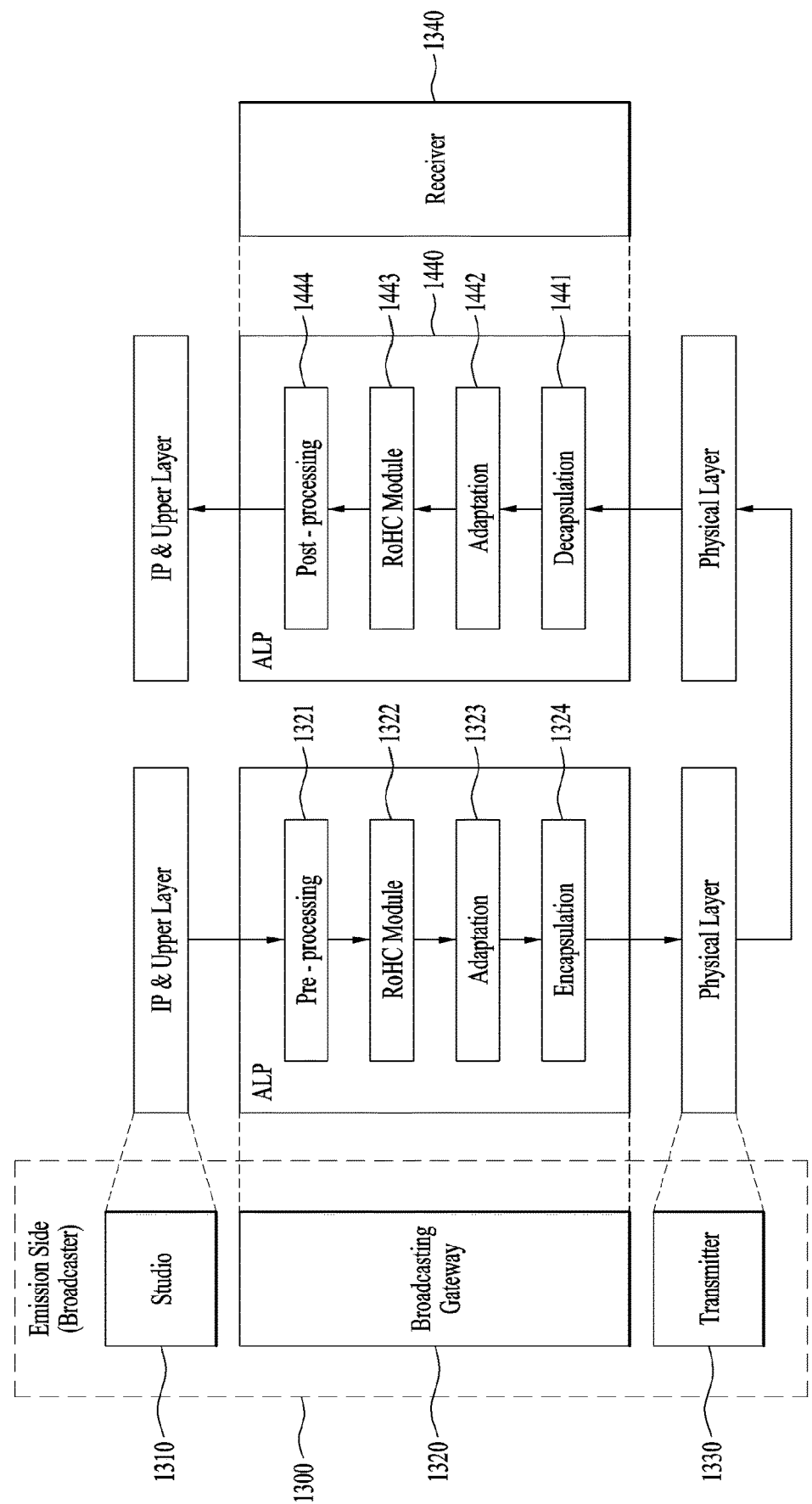
FIG. 26 is a diagram illustrating another embodiment of a broadcast system according to the present disclosure.

FIG. 26 is a diagram illustrating one embodiment of a broadcast system including a broadcast gateway operating in the link layer according to the present disclosure. That is, in one embodiment, the pre-processor 1321 is located prior to the RoHC module 1322 of the broadcast gateway 1320.

Figure 27:
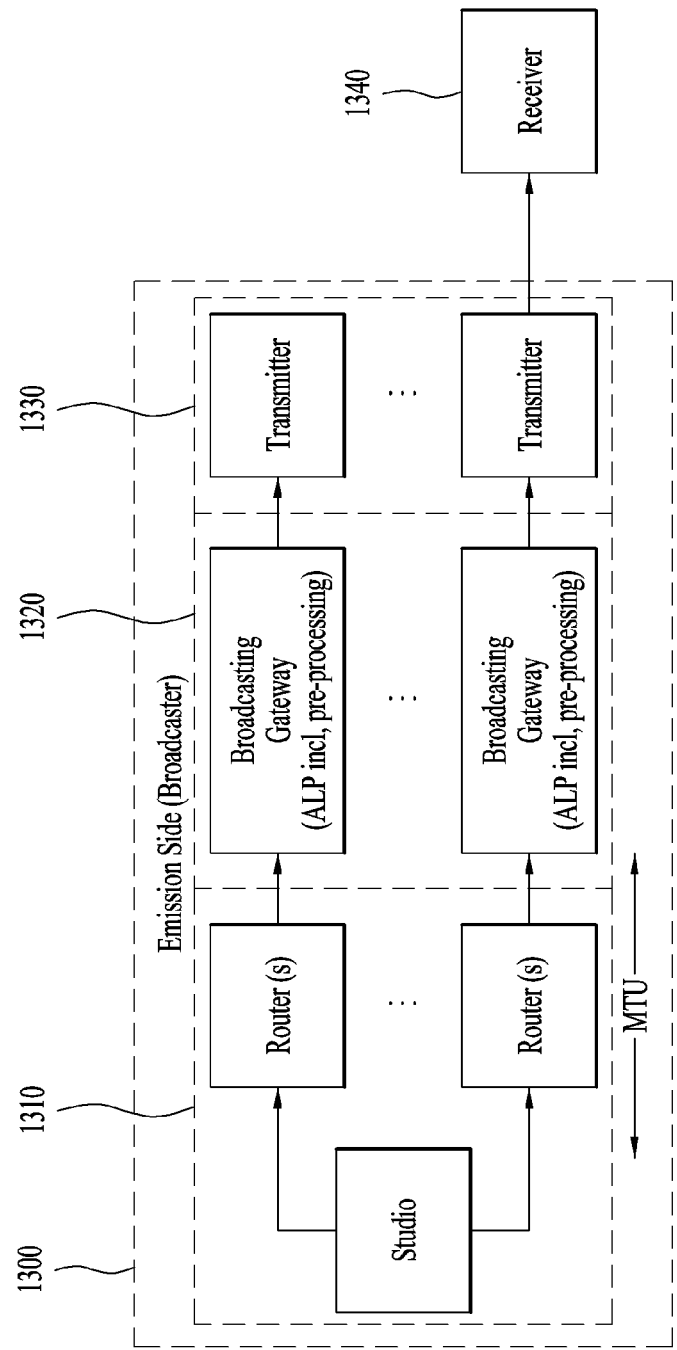
FIG. 27 is a block diagram illustrating one embodiment of a broadcast network structure of a broadcast system of FIG. 26.

FIG. 27 is a block diagram illustrating one embodiment of a broadcast network structure of the broadcast system of FIG. 26, wherein the pre-processor is included in the broadcast gateway.

In one embodiment, the transmitting side 1300 of the broadcast system in FIGS. 26 and 27 includes a studio 1310, a broadcast gateway 1320, and a transmitter 1330.

In one embodiment, the studio 1310 performs operations and a transmission function in the IP/UDP layer and layers more than the IP/UDP layer. In one embodiment, the broadcast gateway 1320 performs an operation and a transmission function in the link layer (that is, Layer 2).

If packets transmitted from the studio 1310 are IP packets, the broadcast gateway 1320 includes a pre-processor 1321, a RoHC module 1322, an adaptation module 1323, and an encapsulation module 1324 in accordance with one embodiment.

In one embodiment, the transmitter 1324 performs an operation and a transmission function in the physical layer. In one embodiment, the transmitter 1324 includes the broadcast signal transmission device of FIG. 15.

In one embodiment, the studio 1310 encodes video and/or audio data, and configures a delivery format by using ROUTE and/or MMT packets including the encoded video and/or audio data. The studio 1310 packetizes the ROUTE packets and/or MMT packets in IP/UDP packets. At this time, the IP/UDP packets are transmitted to the broadcast gateway 1320, that is, the link layer in accordance with MTU of a link between the studio and the broadcast gateway or a router, or are fragmented to a plurality of fragment packets and then transmitted to the link layer. That is, in one embodiment, if a length of the IP/UDP packets is longer than the MTU, fragmentation is performed for the IP/UDP packets.

Figure 28:
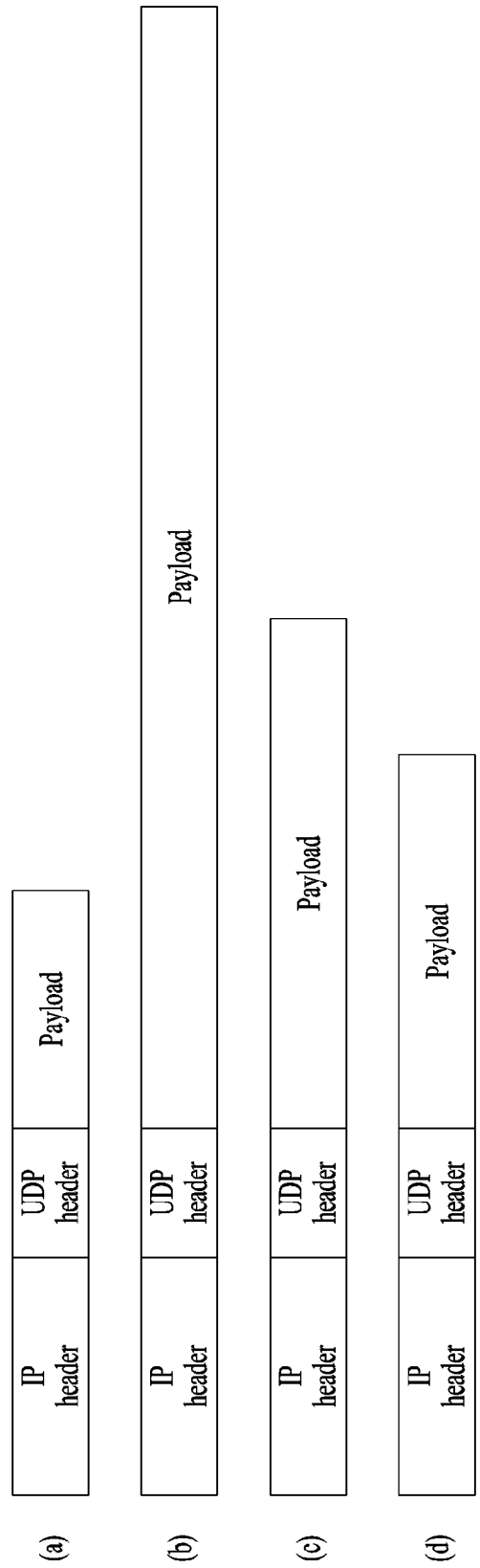
FIGS. 28(a) to 28(d) are diagrams illustrating one embodiment of IP packets generated in IP/UDP layer according to the present disclosure.
Figure 29:
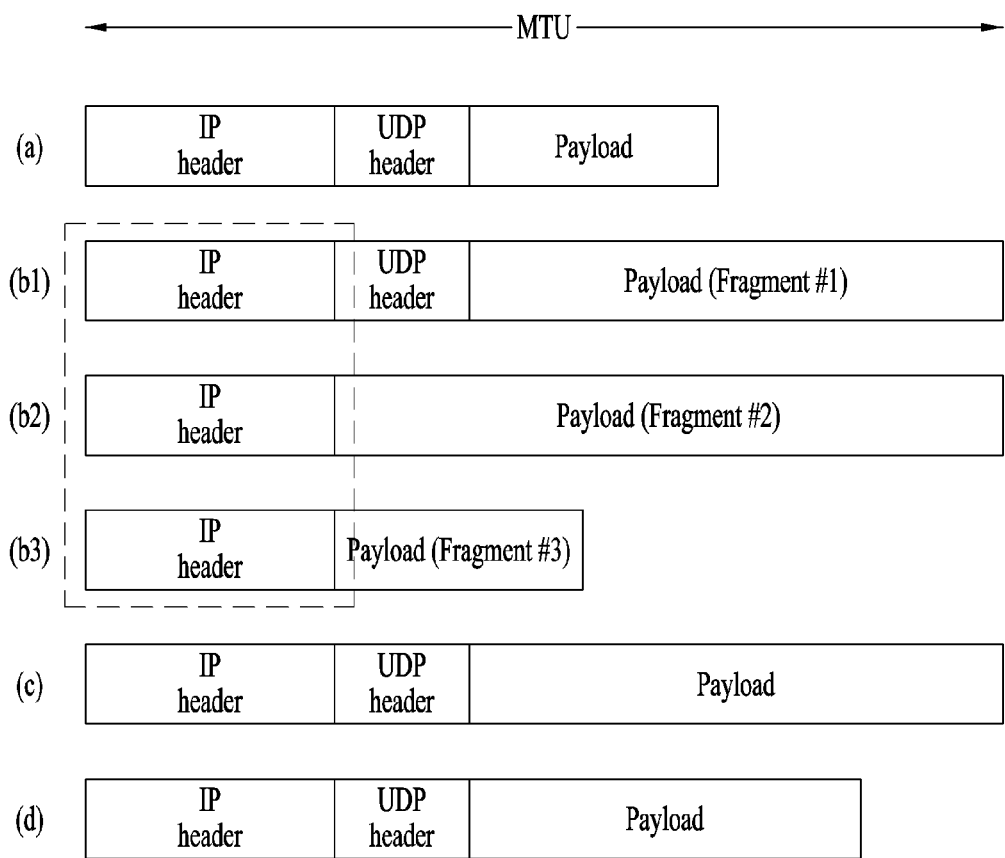

FIGS. 28(a) to 28(d) are diagrams illustrating one embodiment of four IP packets generated in the IP/UDP layer of the studio 1310, FIGS. 29(b1) to 29(b3) are diagrams illustrating that fragmentation is performed for IP packets of FIG. 28(b) to generate three fragment packets. That is, packet streams (that is, broadcast streams) including the IP packets of FIGS. 29(a), 29(b1) to 29(b3), 29(c) and 29(d) are input to the pre-processor 1321 of the broadcast gateway 1320 operating in the link layer through each router of the studio 1310.

When fragmentation is performed for the IP packets having the IP header and the UDP header, that is, IP/UDP packets, as shown in FIGS. 29(b1) to 29(b3), it is noted that the UDP header exists only in the first fragment packet and does not exist in the other fragment packets. The IP header exists in all the fragment packets.

The pre-processor 1321 detects whether IP fragmentation has been applied to the input packet streams with reference to each IP header of the IP packets within the input packet streams. In one embodiment, if the fragment packets subjected to IP fragmentation are detected, the fragment packets are stored in a buffer or memory until all the fragment packets constituting the corresponding IP/UDP packets are received. If all the fragment packets constituting the corresponding IP/UDP packets are received, the received fragment packets are combined to be restored to the original IP/UDP packets. That is, the IP/UDP packets (that is, IP streams) restored through pre-processing performed by the pre-processor 1321 are the same as the IP/UDP packets (that is, IP streams) desired to be transmitted by the initial studio 1310.

Figure 30:
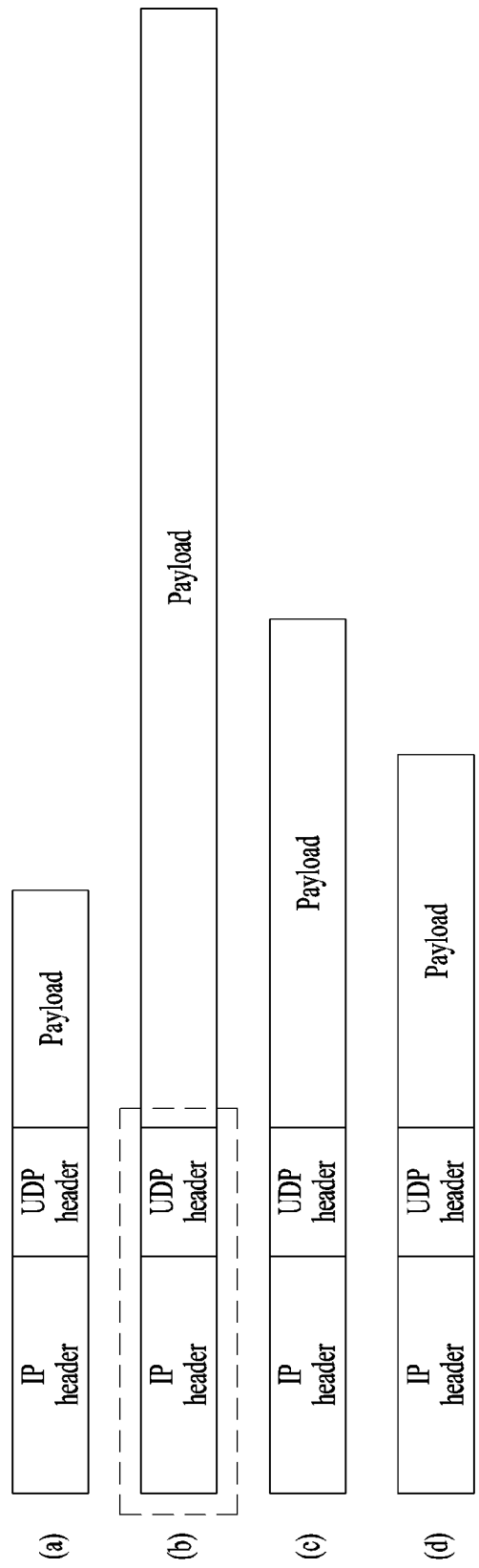
FIGS. 30(a) to 30(d) are diagrams illustrating one embodiment of pre-processing applied to IP packets of FIGS. 29(a), 29(b1) to 29(b3), 29(c) and 29(d)
Figure 31:
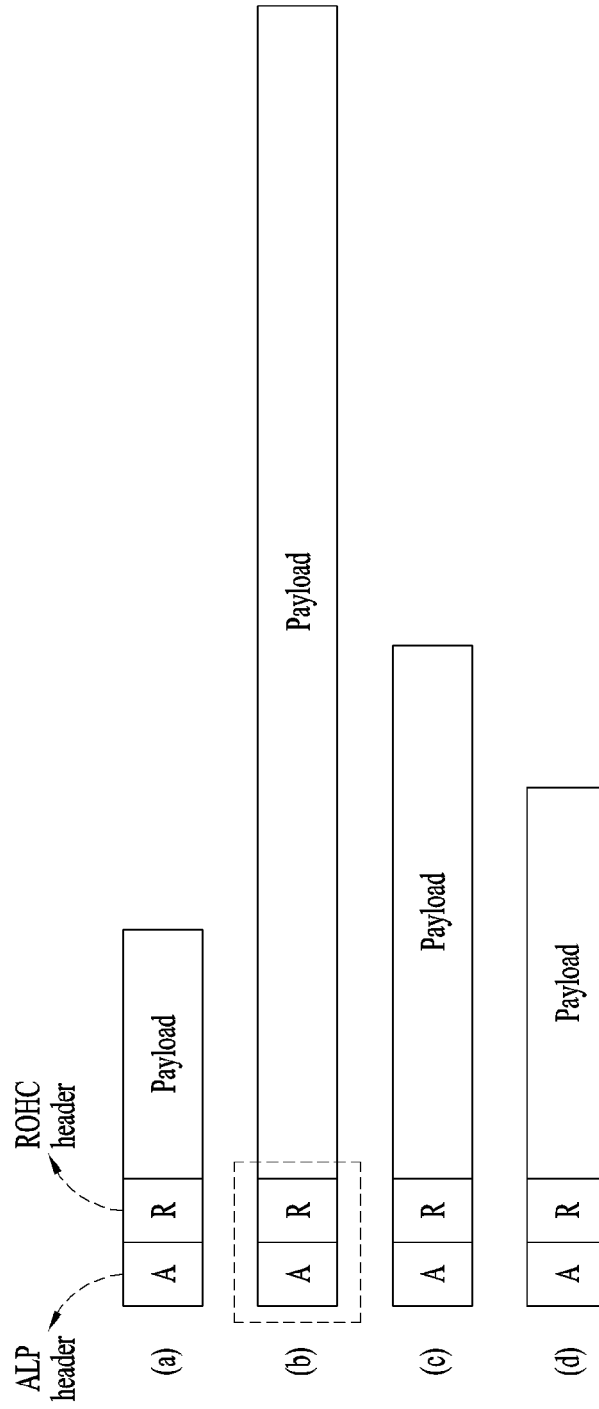
FIGS. 31(a) to 31(d) are diagrams illustrating one embodiment of header compression and link layer packet encapsulation applied to IP packets of FIGS. 30(a) to 30(d)

For example, if three fragment packets fragmented from the IP/UDP packets are input to the pre-processor 1321 as shown in FIGS. 29(b1) to 29(b3), the pre-processor 1321 waits for the fragment packets while storing the received packets until the three fragment packets are received. If three fragment packets are all received, the three fragment packets are combined to be restored to the IP/UDP packets prior to fragmentation as shown in FIG. 30(b).

The IP packets (that is, IP/UDP packets) of FIGS. 30(a) to 30(d), which are pre-processed by the pre-processor 1321, are output to the RoHC module 1322.

The RoHC module 1322 performs IP header compression by applying the RoHC scheme to the input IP packets.

At this time, since the IP packets input to the RoHC module 1322 include both the IP header and the UDP header, header compression is performed for the IP packets in 0x02 profile, and the other profiles are not considered. In implementation of the transmission system, a packet classification function of the RoHC module 1322 may be reused for this pre-processing.

FIGS. 31(a) to 31(d) are diagrams illustrating that IP header compression is performed for four IP packets by using a RoHC scheme and then the IP packets are encapsulated into ALP packets when the four IP packets are received as shown in FIGS. 30(a) to 30(d). In this case, RoHC header is added to each payload by header compression and ALP header is added thereto by encapsulation processing, whereby four ALP packets are generated. In this way, the generated ALP packets are transmitted to the physical layer.

The detailed operation of the RoHC module 1322, the adaptation module 1323, and the encapsulation module 1324 has been described as above and therefore will be omitted herein.

Figure 32:
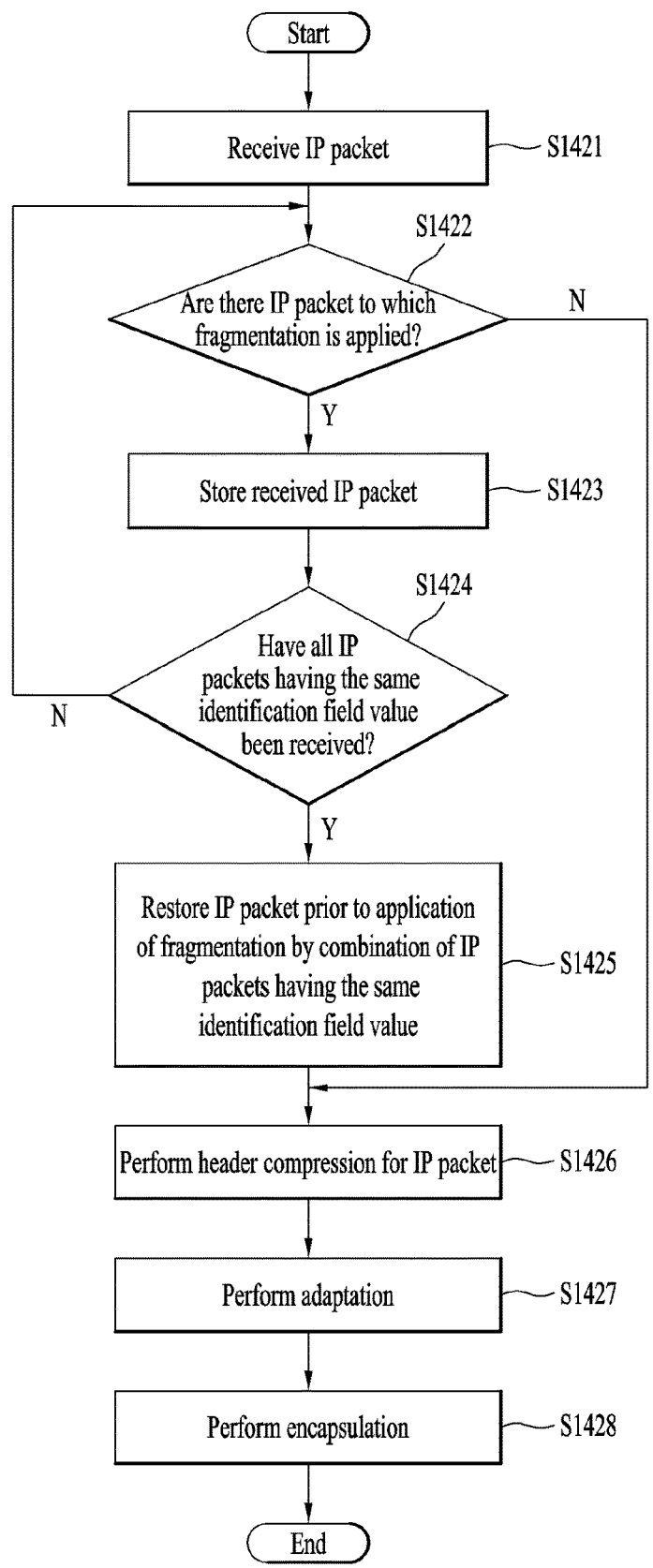
FIG. 32 is a flow chart illustrating an operation of a broadcast gateway including a pre-processor according to one embodiment of the present disclosure.
Figure 33:
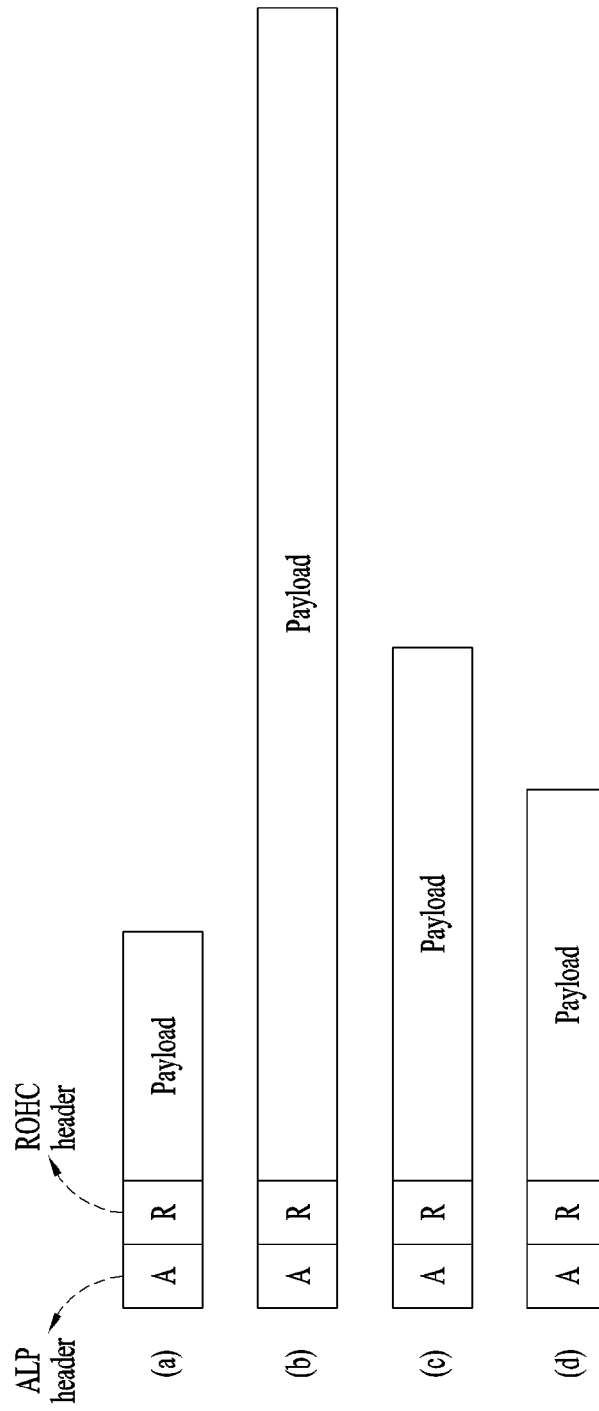
FIGS. 33(a) to 33(d) are diagrams illustrating one embodiment of ALP packets received by a receiver according to the present disclosure.

FIG. 32 is a flow chart illustrating an operation of a broadcast gateway including a pre-processor 1321 according to one embodiment of the present disclosure. In the present disclosure, header compression of the IP packets is optional, and FIG. 32 illustrates that header compression is performed for an IP stream including IP packets.

As shown in FIG. 19, the IP header of the IP packet includes fields related to fragmentation. In the present disclosure, it is noted from the fields whether the corresponding IP packet is a fragment packet to which fragmentation is applied. If the corresponding IP packet is a fragment packet, it is noted whether the fragment packet is the last fragment packet, and a relative position within the IP/UDP packet of the corresponding fragment packet may be identified. For example, in one embodiment, the fields related to fragmentation include an identification field, a DF flag and MF flag included in the IP flags field, and a fragment offset field.

That is, if the IP packets are received from the IP/UDP player (S1421), the pre-processor 1321 checks whether the received IP packets are fragmented IP packets to which fragmentation is applied (S1422). For example, the pre-processor 1321 checks whether the corresponding IP packet is a fragmented IP packet, by using the DF flag of the IF Flags field within the IP header of the received IP packets. For example, if the DF flag has a value of 0, the pre-processor 1321 determines that the corresponding IP packet is the fragmented IP packet.

If it is checked that the received IP packets are the packets to which fragmentation is not applied in the step S1422 (that is, DF flag value is 1), step S1426 is performed for header compression of the received IP packets.

If it is checked that the received IP packets are the packets to which fragmentation is applied in the step S1422, the received IP packets are stored, and one or more IP packets having the same value as the Identification field value within the IP header of the IP packets are waited (S1423). This procedure is repeated until the IP packets having the same identification field value are all received and stored. MF flag within the IP header may be used for a method for checking whether all the IP packets having the same identification field value have been received. That is, if the MF flag value is 1, it indicates that fragmented IP packets further exist, and if the MF flag value is 0, it indicates that the corresponding IP packet is the last fragmented IP packet. Therefore, if the IP packets having the MF flag value of 0 are received, it may be determined that all the IP packets having the same identification field value have been received. In addition, in order to enhance reliability, the checksum field and the length field within the UDP header may additionally be used to verify whether all the IP packets having the same identification field value have been received.

If it is determined that all the IP packets having the same identification field value have been received through the above step (S1424), the order of the IP packets is identified using the fragment offset field of the IP header within each IP packet, and the IP packets are combined in the identified order and therefore restored to the IP packets prior to fragmentation (S1425). At this time, in one embodiment, since the restored IP packets are the packets to which fragmentation is not applied, the DF flag value within the IP header of the restored IP packets is set to 1 and the fragment offset field value is set to 0.

The following Table 2 illustrates one embodiment of values of fragmentation related fields within each IP header when the IP packets are fragmented to three fragmented IP packets and values of fragmentation related fields within the IP header when the pre-processor 1321 restores IP packets to the IP packets prior to fragmentation by combining three fragmented IP packets.

TABLE 2

|  | DF flag | MF flag | Identification | Fragment offset |
|---|---|---|---|---|
| Fragmented IP packet 1 | 0 | 1 | 111 | 0 |
| Fragmented IP packet 2 | 0 | 1 | 111 | 1248 |
| Fragmented IP packet 3 | 0 | 0 | 111 | 2048 |
| Recovered IP packet | 1 | 0 | 111 | 0 |

If it is checked that the IP packets received in the step S1422 are the IP packets to which fragmentation is not applied or a plurality of fragmented IP packets are restored to IP packets prior to fragmentation in the step S1425, the RoHC module 1322 performs header compression by applying the RoHC scheme to the IP streams of the input IP packets (S1426). In the step S1426, the RoHC packet flow for which header compression is performed is output to the adaptation module 1323, and the adaptation module 1323 extracts context information from IR and/or IR-DYN packet within the RoHC packet flow based on the adaptation mode.

In one embodiment, the context information is transmitted by being included in RDT of link layer signaling. For example, in case of the adaptation mode 1, there is no procedure of extracting context information, and the RoHC packet flow including IR and IR-DYN packets is encapsulated into at least one ALP packet by the encapsulation module 1324 and then transmitted to the receiver through the data PLP. At this time, link layer signaling including RDT and LMT is encapsulated into at least one ALP packet by the encapsulation module 1324 and then transmitted to the receiver through a signaling PLP to which LLS is transmitted.

In case of the adaptation mode 2, context information (that is, static chain information) is extracted from the IR packet, and the IR packet from which the context information is extracted is converted to the IR-DYN packet. The converted IR-DYN packet is replaced from the original IR packet and transmitted to the encapsulation module 1324 in the same order within the RoHC packet flow. And, the IR-DYN packet is encapsulated into at least one ALP packet and then transmitted to the receiver through the data PLP. The extracted context information is included in the RDT, and the link layer signaling including the RDT and the LMT is encapsulated into at least one ALP packet by the encapsulation module 1324 and then transmitted to the receiver through the signaling PLP to which LLS is transmitted.

In case of the adaptation mode 3, context information (that is, static chain information and dynamic chain information) is extracted from the IR packet, and context information (that is, dynamic chain information) is extracted from the IR-DYN packet. The IR packet and the IR-DYN packet, from which the context information is extracted, are respectively converted to compression packets. The converted compression packets are replaced from the original IR packet and IR-DYN packet and transmitted to the encapsulation module 1324 in the same order within the RoHC packet flow, encapsulated into at least one ALP packet and then transmitted to the receiver through the data PLP. The extracted context information is included in the RDT, and the link layer signaling including the RDT and the LMT is encapsulated into at least one ALP packet by the encapsulation module 1324 and then transmitted to the receiver through the signaling PLP to which LLS is transmitted.

Meanwhile, the physical layer processor D55030 of the receiver in FIG. 17 performs deinterleaving, demapping, and error correction decoding for the signaling PLP and the data PLPs received by being included in the signal frame and outputs the data PLPs and the signaling PLP to the link layer processor D55040. FIG. 18 is a detailed block diagram of the physical layer processor D55030 of FIG. 17, a detailed description has been described as above and will be omitted herein. The link layer processor 1440 of FIG. 26 may be applied to the link layer processor D55040 of FIG. 17.

In one embodiment, the physical layer controller D55010 may quickly identify a signaling PLP, which includes LLS, LMT and RDT, by using the L1B_lls_flag field of the L1-Basic signaling data and the L1D_plp_lls_flag of the L1-Detail signaling data. Therefore, the link layer processor D55040 may acquire link layer signaling information within at least one ALP packet received through the signaling PLP, prior to the RoHC packet flow.

That is, the decapsulation module 1441 of the link layer processor D55040 acquires link layer signaling information by decapsulating at least one ALP packet received through the signaling PLP. The decapsulation module 1441 may acquire the RoHC packet flow by decapsulating at least one ALP packet received through the data PLPs by using LMT and RDT included in the link layer signaling information.

In case of the adaptation mode 1, there is no procedure of extracting context information from the RDT. That is, the RoHC packet flow acquired through the ALP packets received through the data PLPs is output to the RoHC module (that is, decompression block) 1443 by bypassing the adaptation module 1442. The RoHC module 1443 performs header decompression for the RoHC packets within the RoHC packet flow by using compression information included in the RDT and then restores IP packets prior to header compression.

In case of the adaptation mode 2, the adaptation module 1442 extracts context information included in the RDT, and restores the IP Packets by using the extracted context information (that is, static chain information) and the corresponding IR-DYN packet within the RoHC packet flow. The RoHC packet flow including the restored IR packets is output to the RoHC module 1443, and the RoHC module 1443 restores IP packets prior to header compression by performing header decompression for the RoHC packets within the RoHC packet flow by using the compression information acquired from the RDT.

In case of the adaptation mode 3, the adaptation module 1442 extracts the context information included in the RDT. The context information includes static chain information and dynamic chain information extracted from the IP packets, and dynamic chain information extracted from the IR-DYN packets. The adaptation module 1442 restores the IR packets and the IR-DYN packets by using the corresponding compression packets within the RoHC packet flow and the extracted context information. The RoHC packet flow including the restored IR and IR-DYN packets is output to the RoHC module 1443, and the RoHC module 1443 restores the IP packets prior to header compression by performing header decompression for the RoHC packets within the RoHC packet flow by using the compression information acquired from the RDT.

The IP packets restored from the RoHC module 1443 may be transmitted to the IP/UDP layer as they are.

Meanwhile, if the pre-processor 1321 of the broadcast gateway 1320 of the transmitter restores the IP packets prior to fragmentation application by combining the fragmented IP packets and performs header compression, the receiver may need to fragment the corresponding IP packets restored by header decompression to a plurality of fragmented IP packets. In one embodiment, whether to perform fragmentation is determined depending on the MTU of the router or the link between the studio-broadcast gateway. To this end, the receiver of the present disclosure comprises a post processor 1444 provided next to the RoHC module 1443.

In one embodiment of the present disclosure, if the length of the IP packets header decompressed by the RoHC module 1443 is longer than the MTU of the router or the link between the studio-broadcast gateway, the post processor 1444 performs fragmentation for the IP packets. That is, the IP packets are split into two or more fragments and the IP header is added to the front of each fragment to generate fragment packets. In one embodiment, if the post processor 1444 performs fragmentation for the IP packets, some field values within the IP header of the plurality of fragment packets which belong to the IP packets are changed.

For example, it is assumed that the post processor 1444 splits the IP packets into three fragment packets by applying fragmentation to the IP packets. It is also assumed that the first fragment packet is fragment packet A, the second fragment packet is fragment packet B, and the third fragment packet is fragment packet C.

At this time, the identification field values within each IP header of the fragment packets A, B and C are equally set, and a relative position value within the IP packet of the corresponding fragment packet is allocated from the fragment offset field value. The DF flags of the IP Flags field within each IP header of the fragment packets A, B and C are all set to 0 to indicate that the corresponding packets are fragmented packets. In addition, the MF flags of the IP Flags field within each IP header of the fragment packets A and B are set to 1 to indicate that there is additional fragment packet, and the MF flag within the IP header of the fragment packet C is set to 0 to indicate that last fragment packet.

If fragmentation is not performed for the IP packets header decompressed by the RoHC module 1443, the post processor 1444 performs a function of a buffer.

The IP packet which bypasses the post processor 1444 or a plurality of fragment packets fragmented by the post processor 1444 are input to the IP/UDP layer processor D55050. The IP/UDP layer processor D55050 checks whether fragmentation has been applied to the input IP packets, with reference to each IP header of the input IP packets. When fragmentation is applied to the input IP packets, the method for restoring the input IP packets to the original IP packets has been described as above and will be omitted herein. The IP/UDP packet processor D55050 filters a specific one from one or more IP packets after the IP packet restoring procedure is performed, and outputs the IP packet in the form of application layer transport protocol packet such as ALC/LCT+.

FIGS. 33(a) to 33(d) are diagrams illustrating one embodiment of ALP packets input to the decapsulation module 1441 of the link layer processor 1440 of the receiver. If decapsulation, adaptation and decompression are performed for the ALP packets of FIGS. 33(a) to 33(d) while sequentially passing through the decapsulation module 1441, the adaptation module 1442, and the RoHC module 1443, the IP packets of FIGS. 34(a) to 34(d) are restored.

Figure 34:
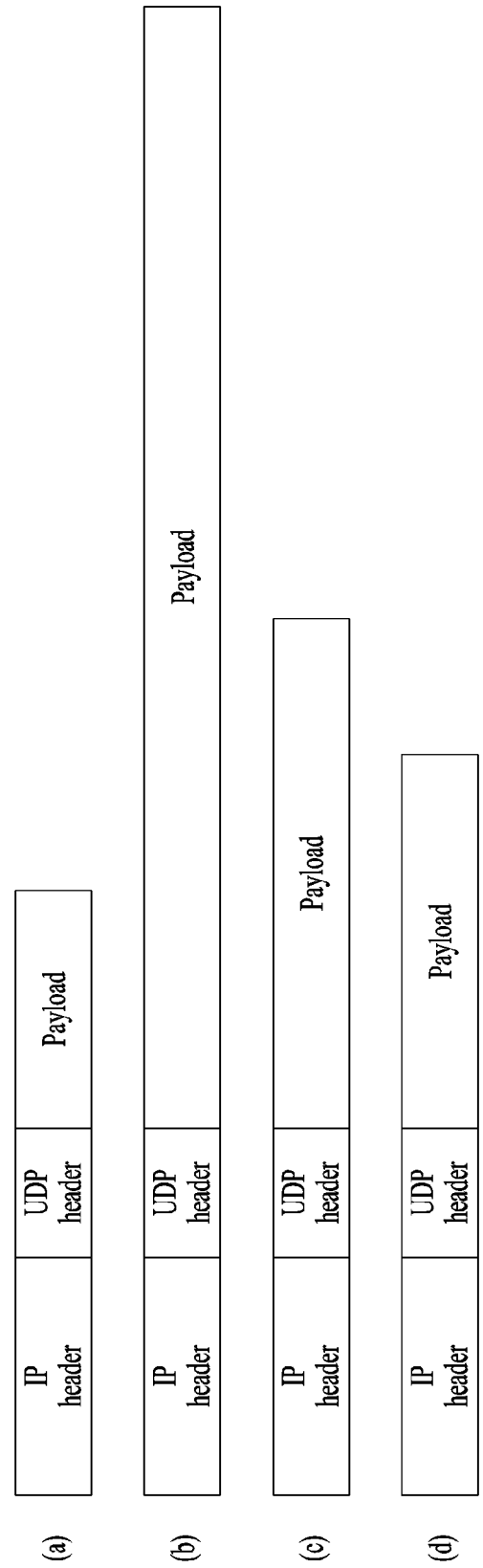
FIGS. 34(a) to 34(d) are diagrams illustrating one embodiment of IP packets acquired by application of decapsulation and header compression to ALP packets of FIGS. 33(a) to 33(d)
Figure 35:
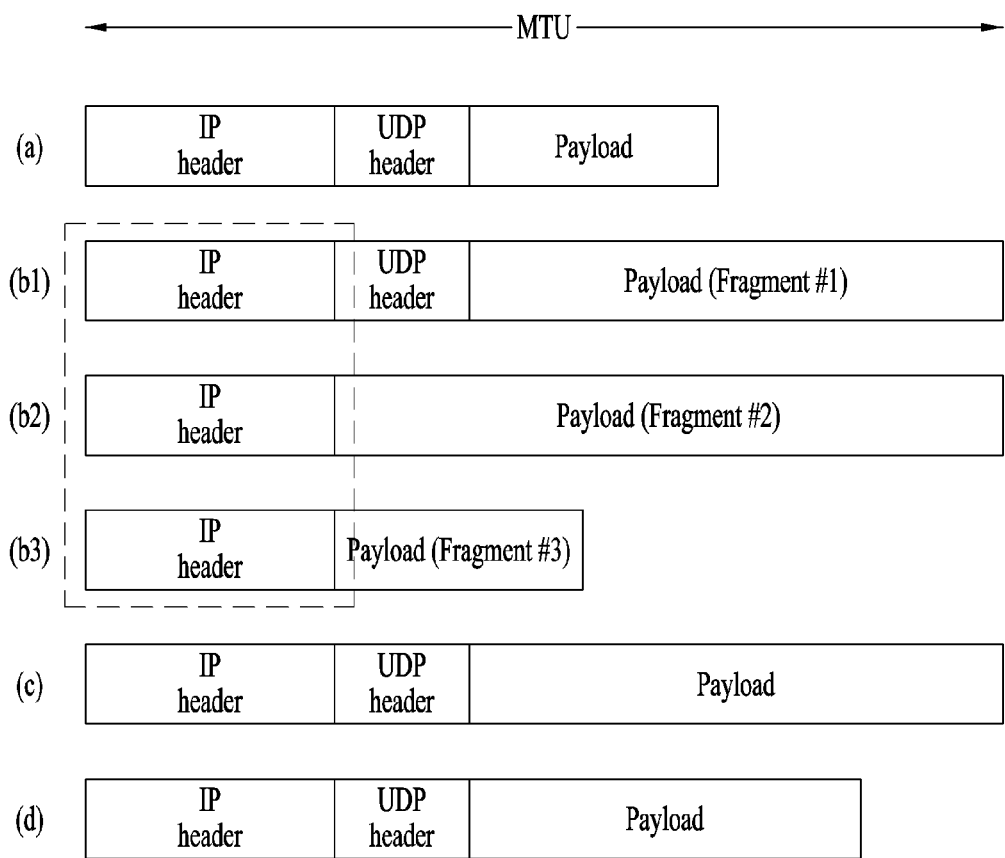
Figure 36:
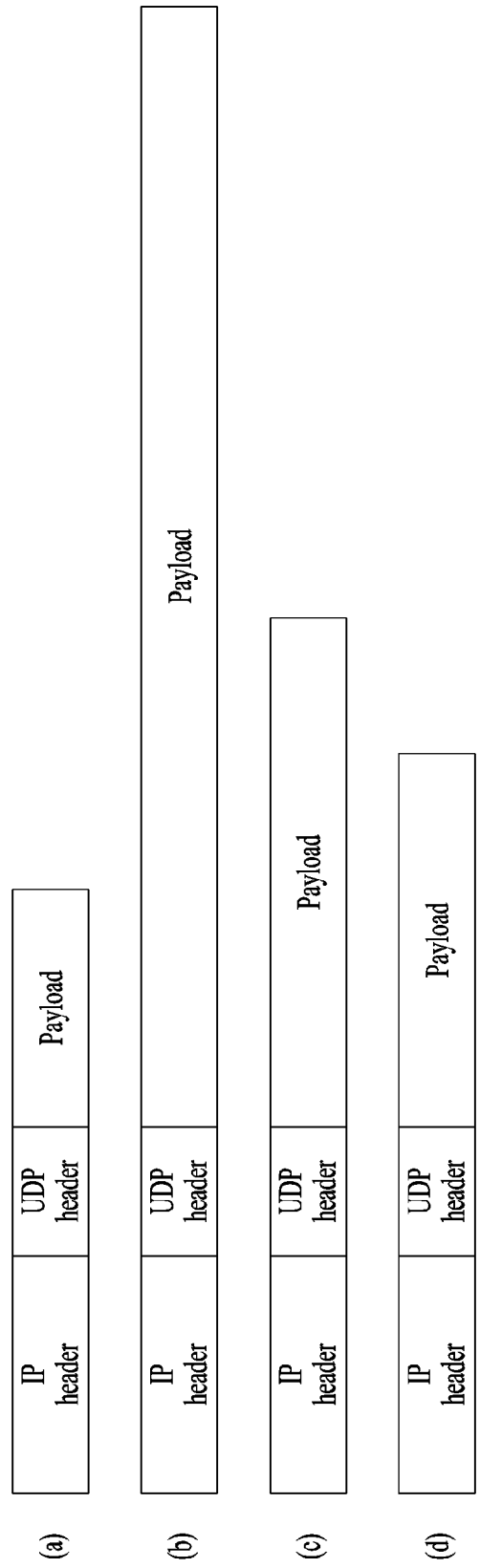
FIGS. 36(a) to 36(d) are diagrams illustrating one embodiment of the present disclosure in which IP packets to which fragmentation is applied in FIGS. 35(a), 35(b1) to 35(b3), 35(c) and 35(d) are restored to original IP packets.

FIGS. 35(b1) to 35(b3) are diagrams illustrating that a post processor 1444 splits IP packets of FIG. 34(b) into three fragmented IP packets by applying fragmentation to the IP packets. The IP/UDP packet processor D55050 may restore fragmented IP packets of FIGS. 35(b1) to 35(b3) to the original IP packets of FIG. 36(b) by combining the fragmented IP packets.

In the present disclosure, an example that RDT including header compression information and context information (adaptation modes 2 and 3) is transmitted to and received in the signaling PLP has been described as above.

As another embodiment of the present disclosure, the RDT may be divided into two types. One of the two types will be referred to as catalog RDT, and the other one will be referred to as discrete RDT. In the present disclosure, for convenience of description, the catalog RDT may be referred to as a first RDT, and the discrete RDT may be referred to as a second RDT.

In one embodiment of the present disclosure, the catalog RDT is defined as RDT delivery type that includes context data for one or more RoHC/ALP streams and transmitted to the signaling PLP. Therefore, in the present disclosure, multiple RDTs for multiple ALP streams may be provided. In one embodiment, the signaling PLP transmits LMT, LLS, etc. The catalog RDT may be received by the receiver at a random access point. The catalog RDT may be transmitted to a specific PLP which is robust, instead of the signaling PLP. That is, in one embodiment, the PLP for transmitting the catalog RDT and the PLP for transmitting the RoHC packet flow related to the catalog RDT are different from each other.

In the present disclosure, the discrete RDT is defined as RDT delivery type exclusively carried within ALP streams supported by itself. This access is suitable for RFC 3095, and context is always carried within related IP streams. That is, the discrete RDT is frequently generated depending on context change, and may be transmitted to the PLP, to which the RoHC packet flow is transmitted, together with the RoHC packet flow. If context is changed, since the discrete RDT is generated and immediately transmitted, the discrete RDT may not be transmitted at the random access point. That is, in one embodiment, the PLP for transmitting the discrete RDT and the PLP for transmitting the RoHC packet flow related to the discrete RDT are the same as each other.

A syntax structure of the catalog RDT and a syntax structure of the discrete RDT may be the same as each other or different from each other. In one embodiment of the present disclosure, the catalog RDT and the discrete RDT follow the RDT syntax structure of FIG. 14.

In one embodiment, '100' is allocates as a value of a packet type field of ALP packet for transmitting the catalog RDT and a value of a packet type field of ALP packet for transmitting the discrete RDT, as shown in FIGS. 10 and 11.

If the value of the packet type field of the ALP packet is '100', the header of the corresponding ALP packet further includes additional header for signaling information as shown in FIG. 11. FIG. 12 illustrates an example of a syntax structure of additional header for the signaling information. The detailed description of FIGS. 10 to 12 has been made as above and therefore will be omitted herein.

In one embodiment, when the catalog RDT and the discrete RDT are transmitted at the same time, the receiver first processes the catalog RDT if the receiver is changing a channel.

In one embodiment, when the catalog RDT and the discrete RDT are transmitted at the same time, the receiver first processes the discrete RDT if the receiver is receiving content streams.

In order to perform this operation, the receiver needs to identify the catalog RDT from the discrete RDT.

The present disclosure suggests various embodiments for identifying the catalog RDT from the discrete RDT.

The first embodiment is an identification method using a signaling_type field of additional header for signaling information within the ALP header of the ALP packet. That is, the receiver identifies that a table delivered to a payload of the corresponding ALP packet is a catalog RDT if the packet type field of the ALP packet received in the signaling PLP has a value of '100' and the signaling_type field of additional header for signaling information of the corresponding ALP packet has a value of 0x02. The receiver identifies that a table delivered to the payload of the corresponding ALP packet is a discrete RDT if the packet type field of the ALP packet received in the data PLP has a value of '100' and the signaling_type field of additional header for signaling information of the corresponding ALP packet has a value of 0x02.

The second embodiment is a method for using a signaling_type_extension field of additional header for signaling information within the ALP header of the ALP packet. In one embodiment of the present disclosure, 0x0000 is allocated as a value of the signaling_type_extension field for the catalog RDT, and 0xFFFF is allocated as a value of the signaling_type_extension field for the discrete RDT. The receiver identifies that a table delivered to the payload of the corresponding ALP packet is a catalog RDT if the packet type field of the ALP packet has a value of '100' and the signaling_type_extension field of additional header for signaling information of the corresponding ALP packet has a value of 0x0000 as shown in FIG. 37. The receiver identifies that a table delivered to the payload of the corresponding ALP packet is a discrete RDT if the packet type field of the ALP packet has a value of '100' and the signaling_type_extension field of additional header for signaling information of the corresponding ALP packet has a value of 0xFFFF as shown in FIG. 38.

The third embodiment is a method for using a context_config field indicating a combination of context information of RDT as shown in FIG. 39. That is, in one embodiment, if there is context information for the catalog RDT in the RDT, this field is set to '0'. In one embodiment, if the context_config field has a value of '0', a context_length field and a catalog_RDT_context( ) field are included in a corresponding loop.

The context_length field indicates a length of the catalog_RDT_context( ) field.

In one embodiment, the catalog_RDT_context( ) field necessarily includes static_chain_byte ( ). The catalog_RDT_context( ) field conveys static or dynamic information used to reset the decompressor. A size and a structure of the catalog_RDT_context( ) field are varied depending on a context profile. If static_chain_byte ( ) or dynamic_chain_byte ( ) is included in the corresponding table, the corresponding field may be set to '0x01' or '0x02'. If both static_chain_byte ( ) and dynamic_chain_byte ( ) are included in the corresponding table, the corresponding field may be set to '0x03'. In case of the adaptation mode 2, the corresponding table does not include dynamic_chain_byte ( ). In case of the adaptation mode 3, the corresponding table may include dynamic_chain_byte ( ).

The fourth embodiment is a method for adding RDT_type field to RDT as shown in FIG. 40. The RDT_type field is allocated with 4 bits, and indicates a type of the corresponding RDT. In one embodiment of the present disclosure, as shown in FIG. 41, if the RDT_type field has a value of 0000, the corresponding table is identified as the catalog RDT, and if the RDT_type field has a value of 0001, the corresponding table is identified as the discrete RDT.

The internal components of the apparatus may be processors that execute consecutive processes stored in a memory or other hardware components. These may be located inside/outside the apparatus.

In some embodiments, the above-described modules may be omitted, or may be replaced by other modules that perform the same or similar operations.

The above-described parts, modules, or units may be processors or hardware parts that execute consecutive processes stored in a memory (or a storage unit). The steps described in the above-described embodiments can be performed by processors or hardware parts. The modules/blocks/units described in the above-described embodiments can operate as hardware/processors. In addition, the methods proposed by the present invention can be executed as code. Such code can be written on a processor-readable storage medium and thus can be read by a processor provided by an apparatus.

While the present invention has been described with reference to separate drawings for the convenience of description, new embodiments may be implemented by combining embodiments illustrated in the respective drawings. As needed by those skilled in the art, designing a computer-readable recording medium, in which a program for implementing the above-described embodiments is recorded, falls within the scope of the present invention.

The apparatus and method according to the present invention is not limitedly applied to the constructions and methods of the embodiments as previously described; rather, all or some of the embodiments may be selectively combined to achieve various modifications.

Meanwhile, the method according to the present specification may be implemented as code that can be written on a processor-readable recording medium and thus read by a processor provided in a network device. The processor-readable recording medium may be any type of recording device in which data are stored in a processor-readable manner. The processor-readable recording medium may include, for example, read only memory (ROM), random access memory (RAM), compact disc read only memory (CD-ROM), magnetic tape, a floppy disk, and an optical data storage device, and may be implemented in the form of a carrier wave transmitted over the Internet. In addition, the processor-readable recording medium may be distributed over a plurality of computer systems connected to a network such that processor-readable code is written thereto and executed therefrom in a decentralized manner.

In addition, it will be apparent that, although the preferred embodiments have been shown and described above, the present specification is not limited to the above-described specific embodiments, and various modifications and variations can be made by those skilled in the art to which the present invention pertains without departing from the gist of the appended claims. Thus, it is intended that the modifications and variations should not be understood independently of the technical spirit or prospect of the present specification.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, rather than by the above description, and all changes that fall within the meaning and equivalency range of the appended claims are intended to be embraced therein.

In addition, the present specification describes both a product invention and a method invention, and descriptions of the two inventions may be complementarily applied as needed.

MODE FOR IMPLEMENTING THE DISCLOSURE

Various embodiments have been described in the best mode for implementing the present disclosure.

INDUSTRIAL APPLICABILITY

The present disclosure is used in the field for a series of broadcast signals.

It will be apparent to those skilled in the art that various modifications and variations can be made in the present disclosure without departing from the spirit and essential characteristics of the present disclosure. Therefore, the scope of the disclosure should be determined by the appended claims and their legal equivalents, rather than by the above description, and all changes that fall within the meaning and equivalency range of the appended claims are intended to be embraced therein.

The invention claimed is:

1. A broadcast signal transmission method by an apparatus, comprising:
   an IP layer processing step of generating Internet protocol (IP) packets including broadcast data, generating fragmented IP packets by fragmenting one or more IP packets among the IP packets and transmitting the fragmented IP packets and the IP packets except for the one or more IP packets to a link layer processing, wherein the link layer processing comprises:
   a first link layer processing step of combining the fragmented IP packets to restore to the one or more IP packets from which the fragmented IP packets were generated;
   a second link layer processing step of
   generating a robust header compression (RoHC) packet stream by performing header compression by applying a RoHC scheme to the IP packets which are received,
   extracting context information from the RoHC packet stream and transmitting the extracted context information and information related to the header compression through a RoHC-U Description Table (RDT), and
   the RDT is categorized into a catalog RDT and a discrete RDT depending on a delivery type; and
   a third link layer processing step of encapsulating the header compressed IP packets into at least one link layer packet and transmitting the at least one link layer packet to a physical layer.

2. The broadcast signal transmission method of claim 1, wherein the IP layer processing step includes splitting the one or more IP packets into fragments and generating the fragmented IP packets by adding an IP header to each fragment if a length of the one or more IP packets is longer than a maximum transmission unit (MTU).

3. The broadcast signal transmission method of claim 2, wherein the first link layer processing step includes collecting the fragmented IP packets and restoring the one or more IP packets by combining the collected fragmented IP packets based on a don't fragment (DF) flag, a more fragment (MF) flag, an identification field, and a fragment offset field within an IP header of the IP packets which are received.

4. The broadcast signal transmission method of claim 1, wherein a header of the at least one link layer packet including the RDT includes additional header for signaling information and wherein the additional header includes signaling type information for indicating a type of a signaling table delivered to a payload of the at least one link layer packet.

5. A broadcast signal transmission apparatus comprising:
   a studio for generating Internet protocol (IP) packets including broadcast data, generating fragmented IP packets by fragmenting one or more IP packets among the IP packets and transmitting the fragmented IP packets and the IP packets except for the one or more IP packets to a broadcast gateway;
   the broadcast gateway for combining the fragmented IP packets to restore to the one or more IP packets from which the fragmented IP packets were generated, generating a robust header compression (RoHC) packet stream by performing header compression by applying a RoHC scheme to the IP packets which are received, extracting context information from the RoHC packet stream and transmitting the extracted context information and information related to the header compression through a RoHC-U Description Table (RDT), wherein the RDT is categorized into a catalog RDT and a discrete RDT depending on a delivery type, encapsulating the header compressed IP packets into at least one link layer packet, and transmitting the at least one link layer packet to a physical layer; and a transmitter for transmitting the at least one link layer packet transmitted from the broadcast gateway through physical layer processing.

6. The broadcast signal transmission apparatus of claim 5, wherein the studio splits the one or more IP packets into fragments and generates the fragmented IP packets by adding an IP header to each fragment if a length of the one or more IP packets is longer than a maximum transmission unit (MTU).

7. The broadcast signal transmission apparatus of claim 6, wherein the broadcast gateway collects the fragmented IP packets and restores the one or more IP packets by combining the collected fragmented IP packets based on a don't fragment (DF) flag, a more fragment (MF) flag, an identification field, and a fragment offset field within an IP header of the IP packets which are received.

8. The broadcast signal transmission apparatus of claim 5, wherein a header of a link layer packet including the RDT includes additional header for signaling information, and wherein the additional header includes signaling type information for indicating a type of a signaling table delivered to a payload of the at least one link layer packet.

* * * * *